United States Patent
Macallen et al.

(10) Patent No.: US 11,345,114 B2
(45) Date of Patent: May 31, 2022

(54) FLEXIBLE FURNITURE WITH WOOD PANELS AND RELATED METHODS

(71) Applicant: MOLO DESIGN, LTD., Vancouver (CA)

(72) Inventors: Todd P. Macallen, Vancouver (CA); Stephanie J. Forsythe, Vancouver (CA)

(73) Assignee: MOLO DESIGN, LTD., Vancouver (CA)

( * ) Notice: Subject to any disclaimer, the term of this patent is extended or adjusted under 35 U.S.C. 154(b) by 0 days.

(21) Appl. No.: 17/263,215

(22) PCT Filed: Aug. 12, 2020

(86) PCT No.: PCT/CA2020/051102
§ 371 (c)(1),
(2) Date: Jan. 26, 2021

(87) PCT Pub. No.: WO2021/026651
PCT Pub. Date: Feb. 18, 2021

(65) Prior Publication Data
US 2021/0308981 A1    Oct. 7, 2021

Related U.S. Application Data

(60) Provisional application No. 62/886,034, filed on Aug. 13, 2019.

(51) Int. Cl.
*B32B 3/12* (2006.01)
*B32B 3/26* (2006.01)
(Continued)

(52) U.S. Cl.
CPC .............. *B32B 3/12* (2013.01); *B32B 3/266* (2013.01); *B32B 5/022* (2013.01); *B32B 5/18* (2013.01);
(Continued)

(58) Field of Classification Search
CPC ...... B32B 2262/062; B32B 2262/0261; B32B 2479/00; B32B 2262/04; B32B 2307/414;
(Continued)

(56) References Cited

U.S. PATENT DOCUMENTS 3,483,070 A * 12/1969 Kennedy .............. B31D 3/0292
428/118
4,694,144 A * 9/1987 Delaroche ............... E06B 9/262
160/107
(Continued)

FOREIGN PATENT DOCUMENTS

CN    201393769 A    2/2010
CN    201700767 A    1/2011
(Continued)

OTHER PUBLICATIONS

International Search Report issued in corresponding PCT Application No. PCT/CA2020/051102; Search completed Oct. 21, 2020.

*Primary Examiner* — Chi Q Nguyen

(57) ABSTRACT

A flexible article is provided having a core formed from a plurality of laminar panels that are inter-connected to provide an expandable structure upon movement of the panels away from each other. Opposite ends of the core terminate in a pair of end panels whereby the end panels may be moved apart to expand the expandable structure. Each of the panels are made from wood material. The panels, for example, include two wood sheets with longitudinally oriented grains and a flexible backing sheet that is sandwiched and adhered between the two wood sheets.

34 Claims, 18 Drawing Sheets

(51) Int. Cl.
| | |
|---|---|
| *B32B 5/02* | (2006.01) |
| *B32B 5/18* | (2006.01) |
| *B32B 7/12* | (2006.01) |
| *B32B 21/04* | (2006.01) |
| *B32B 21/08* | (2006.01) |
| *B32B 21/10* | (2006.01) |
| *A47B 3/00* | (2006.01) |
| *A47B 13/04* | (2006.01) |
| *A47C 4/00* | (2006.01) |
| *A47C 5/14* | (2006.01) |
| *A47C 19/12* | (2006.01) |
| *E04C 3/00* | (2006.01) |
| *E04C 3/36* | (2006.01) |

(52) U.S. Cl.
CPC .............. *B32B 7/12* (2013.01); *B32B 21/047* (2013.01); *B32B 21/08* (2013.01); *B32B 21/10* (2013.01); *A47B 3/002* (2013.01); *A47B 13/04* (2013.01); *A47C 4/00* (2013.01); *A47C 5/14* (2013.01); *A47C 19/12* (2013.01); *B32B 2262/0261* (2013.01); *B32B 2262/04* (2013.01); *B32B 2262/062* (2013.01); *B32B 2307/414* (2013.01); *B32B 2479/00* (2013.01); *E04C 3/005* (2013.01); *E04C 3/36* (2013.01)

(58) Field of Classification Search
CPC ........... B32B 21/08; B32B 7/12; B32B 21/10; B32B 21/047; B32B 5/18; B32B 3/266; B32B 3/12; B32B 5/022; B32B 5/14; B32B 19/12; A47C 4/00; A47C 5/14; A47C 19/12; A47B 13/04; A47B 3/002; E04C 3/005; E04C 3/36
USPC ........ 428/116, 118; 160/84.01, 84.04, 84.05; 156/193, 197
See application file for complete search history.

(56) References Cited

U.S. PATENT DOCUMENTS

| | | | | |
|---|---|---|---|---|
| 6,019,864 | A * | 2/2000 | Jones | B26D 1/04 |
| | | | | 156/182 |
| 6,630,222 | B1 * | 10/2003 | Fay | E04B 1/99 |
| | | | | 160/348 |
| 7,159,634 | B1 * | 1/2007 | Judkins | B26D 1/09 |
| | | | | 156/197 |
| 8,252,137 | B2 * | 8/2012 | Fleming, III | E04C 2/38 |
| | | | | 156/264 |
| 8,689,511 | B2 * | 4/2014 | Fleming, III | B32B 15/10 |
| | | | | 52/582.1 |
| 9,689,161 | B2 | 6/2017 | MacAllen et al. | |
| 9,885,812 | B2 * | 2/2018 | Malkan | G02B 5/22 |
| 2002/0043346 | A1 * | 4/2002 | Zorbas | E06B 9/262 |
| | | | | 160/84.05 |
| 2006/0260231 | A1 | 11/2006 | Macallen et al. | |
| 2007/0029052 | A1 * | 2/2007 | Nien | E06B 9/388 |
| | | | | 160/84.05 |
| 2007/0096609 | A1 | 5/2007 | Chiu | |
| 2009/0078838 | A1 | 3/2009 | Chang | |
| 2015/0322714 | A1 * | 11/2015 | Rupel | E06B 9/262 |
| | | | | 160/84.05 |
| 2016/0163239 | A1 * | 6/2016 | Church | E06B 9/24 |
| | | | | 434/75 |
| 2020/0032580 | A1 * | 1/2020 | Strand | E06B 9/362 |

FOREIGN PATENT DOCUMENTS

| | | |
|---|---|---|
| CN | 201115537 A | 9/2018 |
| EP | 1336471 A | 8/2003 |
| WO | 2011/058348 A | 5/2011 |

* cited by examiner 2601  2601

2701  2702

FLEXIBLE FURNITURE WITH WOOD PANELS AND RELATED METHODS

CROSS-REFERENCE TO RELATED APPLICATIONS

The present application claims priority to U.S. Patent Application No. 62/886,034 filed on Aug. 13, 2019 and titled "Flexible Furniture With Wood Panels and Related Methods", the entire contents of which are herein incorporated by reference.

FIELD OF THE INVENTION

The present invention relates to articles of flexible furniture that include wood panels.

DESCRIPTION OF THE RELATED ART

Furniture is a staple product used in domestic, working and public environments. Furniture may be used to facilitate the use of space, such as in a seat or table, or lighting, or to divide space, such as in a partition. By way of example, partitions are frequently used to subdivide spaces, or to create more intimate spaces. Typically such partitions are rigid, or have rigid frames, or are formed from rigid interconnected panels and they are relatively large, heavy, and cumbersome, and therefore difficult to set-up, take down, store, and transport. Similarly, other items of furniture, such as seating structures, tables, and lighting, are typically of a rigid nature, or permanent shape that, at most, are moveable to alternative locations.

Moreover, the inherent rigidity of such items of furniture limits the extent to which they can be dynamically resized (extended or contracted) and reshaped to suit varying spaces and requirements, or readily moved around for relocation, or storage.

SUMMARY OF THE INVENTION

According to an example aspect of the present invention there is provided an article of flexible furniture comprising a core formed from a plurality of laminar wooden panels of a wooden material and each panel having a pair of oppositely directed major faces, delimited by a pair of longitudinal edges and by a pair of lateral edges. Adjacent faces of the panels are interconnected along a longitudinal axis to provide a self-supporting cellular structure upon movement of abutting faces away from each other. Opposite ends of the core terminate in a pair of end panels whereby the end panels may be moved apart to expand the cellular structure and extend the length of the core. In an example aspect, the wooden panels have longitudinally oriented wood grains that extend along the length of the wooden panels. In another example aspect, the wooden panels are flexible along their width, so that a given wooden panel can bow or flex about a longitudinal axis. In a further example aspect, the wooden panels are translucent.

In an example embodiment, the wooden panels also include a flexible backing. In a further example aspect, the flexible backing includes a backing sheet. In a further example aspect, the backing sheet includes fibers that extend in directions that are different than the longitudinally oriented wood grains.

In another example embodiment, the wooden panels are impregnated with a plasticizer to make the wooden panels pliable.

Additional aspects and alternative embodiments of the flexible article are provided in the detailed description.

BRIEF DESCRIPTION OF THE DRAWINGS

Embodiments of the invention will now be described by way of example only with reference to the accompanying drawings in which.

DETAILED DESCRIPTION OF THE INVENTION

Figure 1A:
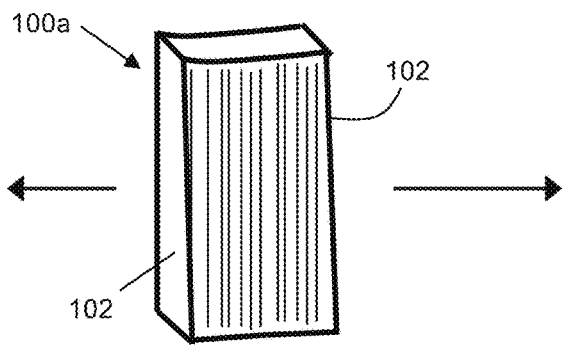
FIG. 1A is a front perspective view of a wood panel partition in a collapsed configuration.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limiting the scope of the example embodiments described herein.

It is herein recognized that making flexible furniture with wood material is difficult since wood is typically a rigid material. Wood material that is too thin will break or snap. Therefore, in the example embodiments described herein, flexible furniture is provided that is formed from flexible wood panels. The flexible furniture is made from collapsible and expandable core that includes cells, and the core is formed from the flexible wood panels. In an example aspect, the flexible wood panels are thin to provide flexibility, and the wood panels are combined with one or more other materials to increase the durability of the wood panels while flexing.

In an example aspect, the wood panels are oriented so that the grain of the wood is generally parallel to the axis of the cells of the collapsible and expandable core. For example, if the cells extend along a vertical direction, then the wood grain is generally oriented vertically too. Similarly, if the cells extend along a horizontal direction, then the wood grain is generally oriented horizontally too.

Different types of flexible furniture can be made from the flexible wood panels. Examples include partitions, chairs, display stands, beds, lights, tables, enclosures, columns, ceilings, etc.

Figure 1B:
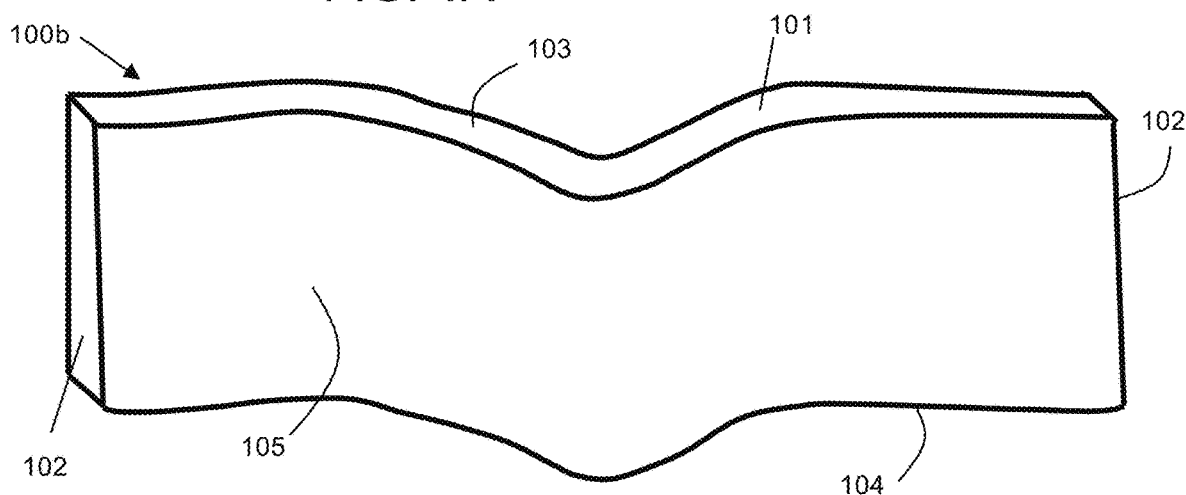
FIG. 1B is a front perspective view of the wood panel partition in an expanded configuration.

Referring to FIG. 1A, a collapsed partition 100a is shown. The same partition 100b in an expanded form is shown in FIG. 1B. The partition includes a flexible core 101 that can expand and collapse. At opposite ends of the core 101 are end panels 102. The core is formed from a plurality of wood panels, which form a cellular structure with vertically oriented voids. The top surface 103 of the core 101 and the bottom surface of the core 104 include openings that are opposite ends of the voids that extend vertically therebetween. The side 105 of the partition includes pleats, which are compressed together when the partition is collapsed.

In an example aspect, the core is made of many cells, and each cell has a void that extends along the length of the cell. The cell can be oriented in vertically, horizontally, at an angle, etc.

Figure 2:
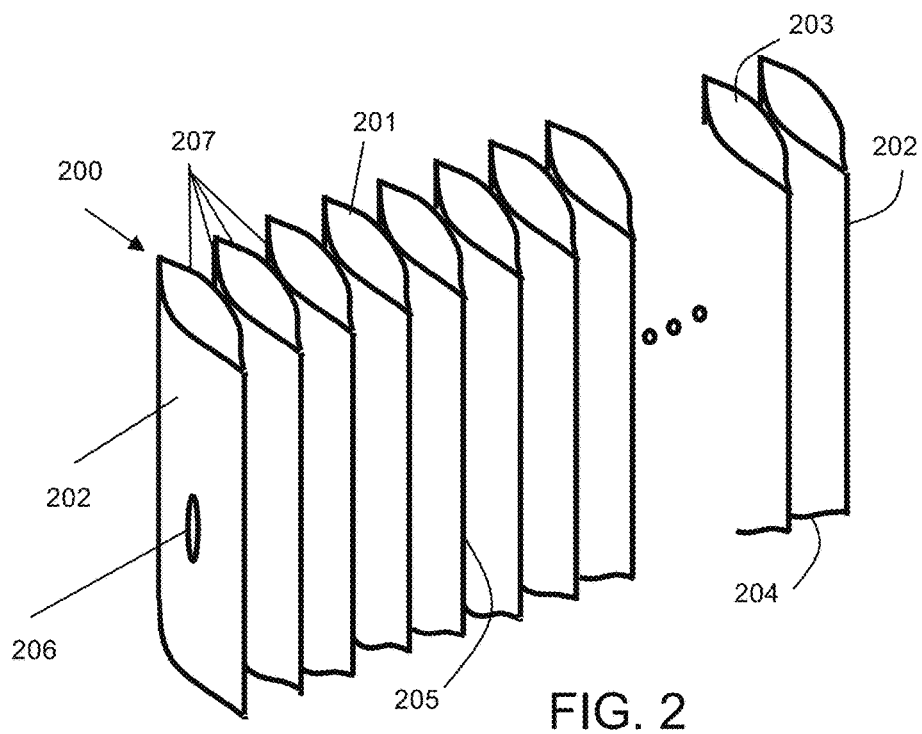
FIG. 2 is an example embodiment of a wood panel partition that includes a handle at each end panel.

FIG. 2 shows a more detailed view of an example embodiment partition 200, which more clearly shows an example configuration of the wood panels 207. In this example, a pair of wood panels 207 form one cell. The connected cells form the flexible and expandable core 201 having a top surface 203, a bottom surface 204 and sides 205. The core 201 also includes end panels 202 positioned at opposite ends of the core. Each end panel 202 includes a hole that is used has a handle to grab and manipulate the end panels 202, and thus the overall core 201.

It will be appreciated that different types of handles can be used instead of a hole (e.g. pull string, pull tab, knob, bar, etc.). It will also be appreciated that, in other example embodiments, there is no handle positioned on the end panels. For example, a person grapping the end panel can grab onto the edge of the end panel.

The core 201 is collapsible so that the major faces of adjacent wood panels 207 lay parallel to one another and in abutment. When the wood panels are abutting each other, the partition 200 may be stored in a flat, collapsed position. When the partition 200 is required, it can be oriented vertically and the opposite end panels 202 are used to manipulate the partition. In particular, the end panels 202 are moved away from one another to expand the core 201 so that the cellular structure is opened within the core. The partition 200 is a free-standing partition that can be used to partition a space (e.g. a room) into smaller spaces. For example, the hole 206 in each end panel 202 forms a handle and it can be grasped so as to pull the end panels away from each other to extend the core 201.

It will be appreciated that although the hole 206 is shown in FIG. 2 being an oval shape, other shapes can be used, including and not limited to irregular shapes. For example, the shape of the hole can be a square, a circle, a triangle, a pentagon, have wavy edges, have rounded corners, etc. In another example embodiment, there are two or more smaller holes, so that each hole is sized large enough for one finger to pass through. In another example embodiment, the position of the hole can vary from what is shown. For example, the position of the hole can be at a fixed height above the ground even as the height of the partition varies. In another example, the hole is offset from the vertical axis of the panel. In another example embodiment, the hole is positioned so that it is centered on the vertical axis and on the horizontal axis of the panel. The different positions of the hole change where the stress is applied and distributed across on the end panel as the edge of the hole is pulled on as a handle.

Figure 3:
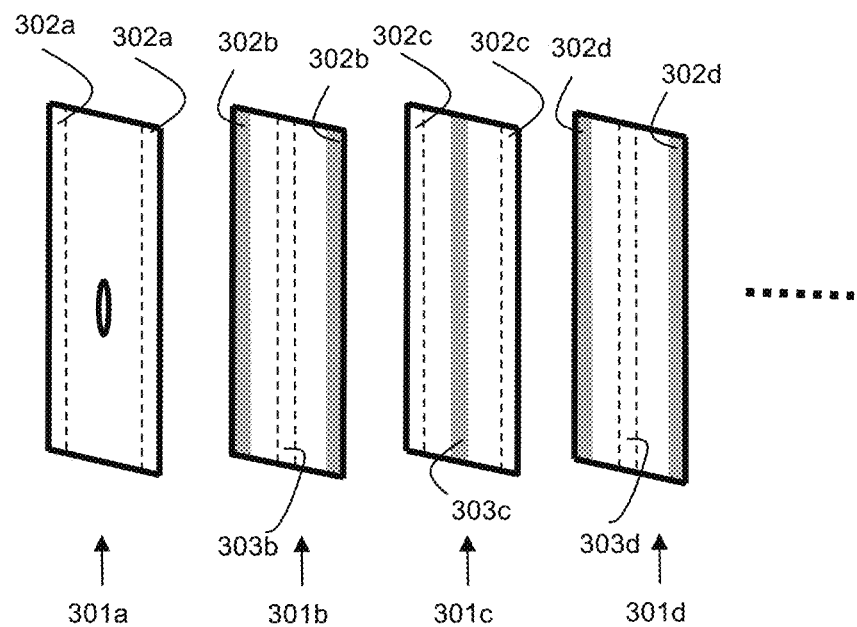
FIG. 3 is a perspective view of panels used to form the example embodiment of a partition shown in FIG. 2.
Figure 4:
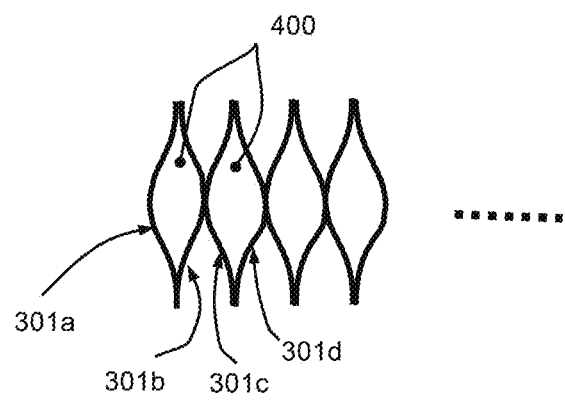
FIG. 4 is a top-down view of a partition formed using the panels of FIG. 3.

FIG. 3 shows a collection of wood panels 301a, 301b, 301c, 301d in an exploded view. FIG. 4 shows these wood panels 301a, 301b, 301c, 301d adhered together to form a core.

The wooden panels 301a, 301b, 301c, 301d have adhesive applied along the vertical axis of the panels. For example, the adhesive strips 302b on the first major face of the panel 301b attach to the outer side regions 302a on the second major face of the panel 301a. The adhesive strip 303c on the first major face of the panel 301c adheres to the middle region 303b on the second major face of the panel 301b. The adhesive strips 302d on the first major face of the panel 301d adhere to the outer side regions 302c on the second major face of the panel 301c. The pattern repeats. As seen from the top view in FIG. 4, voids 400 are created between the wooden panels as they are pulled apart. The voids 400 extend vertically from top to bottom of the core with the wooden panels providing a continuous transverse barrier. The lateral outer ends of each of the wooden panels are connected so as to form vertical pleats on the exterior faces of the core.

In an example embodiment, the adhesive is non-reactive to the wood or another treatment, or both, applied to the first and the second major surfaces of the panels. In an example aspect, the adhesive is pH neutral, having a pH value at 7 or at approximately 7.

In another example embodiment, a different type of attachment is used to connect the edges of the wooden panels together. Other types of attachment include, for example, fasteners and tape.

In this example configuration, pairs of wooden panels each form a cell having a void. For example, panels 301a and 301b form a cell, and panels 301c and 301d form another cell.

It will be appreciated that other cellular configurations can be formed that differ from what is shown in FIG. 4. Examples of other cellular configurations include as a honeycomb-like cellular structure, a cellular structure having circular-shaped cells, and a cellular structure having diamond-shaped cells. It will also be appreciated that the spacing and dimensions of the voids, defined by the cells, in the expandable core can vary.

Figure 19:
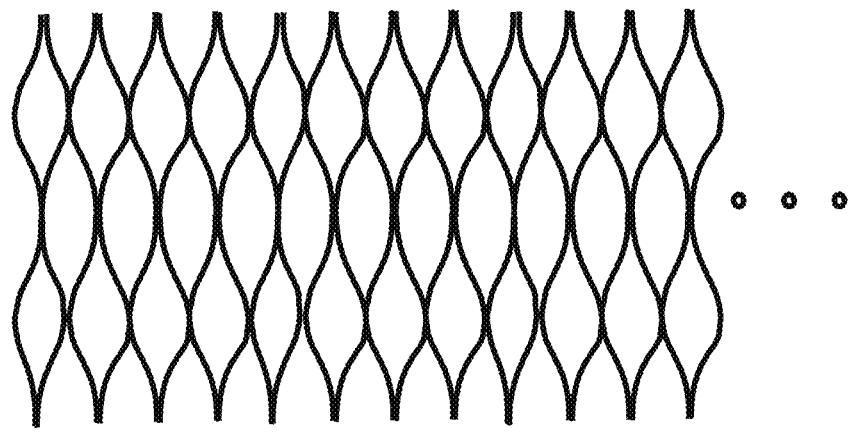
FIG. 19 is a top-down view of an alternative example embodiment of a cellular core formed by wood panels.
Figure 20:
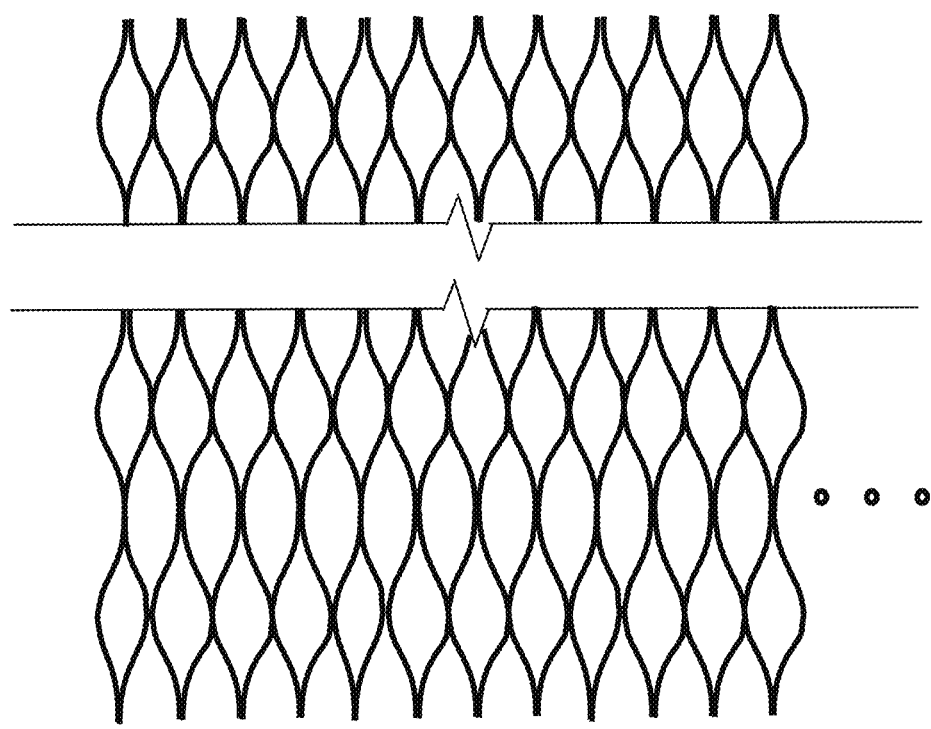
FIG. 20 is a top-down view of an alternative example embodiment of a cellular core formed by wood panels.

Turning briefly to FIG. 19, another example embodiment of a cellular configuration is shown from a top-down view, which shows three cells that form the width of the core. Turning briefly to FIG. 20, another example embodiment of a cellular configuration is shown from a top-down view, which shows multiple cells that form the width of the core. The core formed from wooden panels can be used in various flexible articles, including and not limited to partitions, seats, lights, beds, tables, enclosures, stands, columns, etc. The size and shape of the core is adjusted to suit the particular flexible article.

Figure 5:
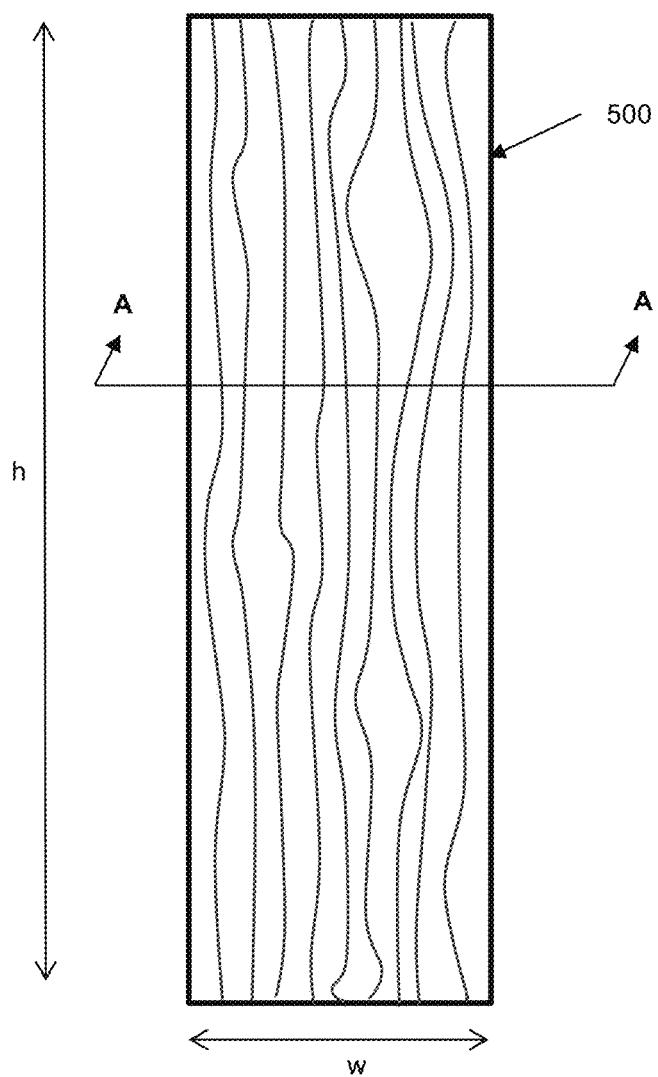
FIG. 5 is an example of a wood panel used in the wood panel partition showing the wood grain.

Turning to FIG. 5, an example embodiment of a given wooden panel 500 is shown in isolation. This wooden panel 500, for example, is an instance of the wooden panels 301b, 301c, 301d. The wooden panel has a major dimension or height h and a width w which may be adjusted to suit particular environments.

In some example embodiments, the height will be in the order of 1-2 metres but could range from 0.5-3 metres when used as a partition, or 0.1 metres to 0.5 metres when used as a seat. The width is typically in the order of 30 centimetres but could range from 10-100 centimetres.

In some cases, depending on the article, the width is even wider and the height is even taller. For example, a bed may be wider, or a column may be taller. It is therefore appreciated that the width and height of the wooden panels depends on the flexible article.

In an example aspect, each of the wooden panels have wood grains that are vertically oriented, so that the wood grain run from the top to the bottom of the wooden panel. This provides flexibility across the width as the wooden panel flexes or bows when forming the expanded core, as shown in FIG. 4 from the top-down view. The vertically oriented wood grain also provides structural rigidity along the height of the core. It will be appreciated that, in this example, the longitudinal dimension of the wooden panels coincides with the vertical dimension of the wooden panels. As such, the wood grain is also herein referred to be longitudinally oriented.

Figure 6:
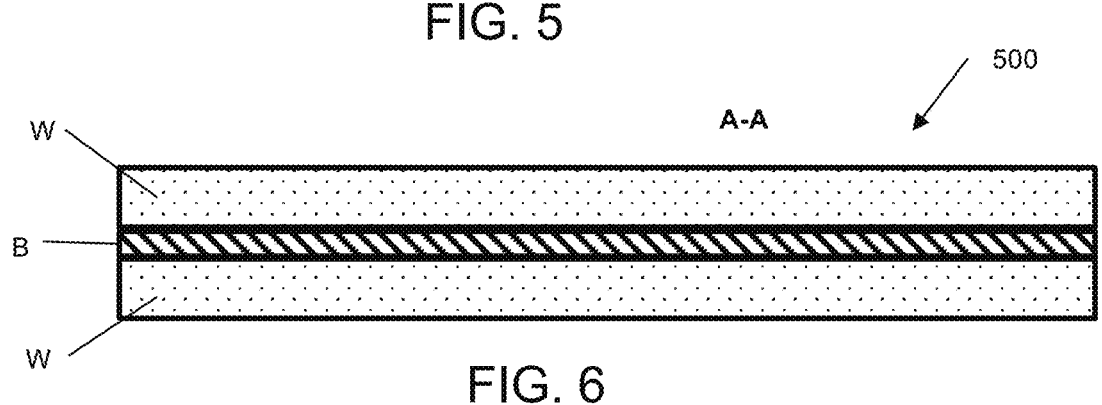
FIG. 6 is a cross-sectional view taken along the line A-A in FIG. 5, showing a 2-ply construction.

FIG. 6 shows a cross-sectional view of the wooden panel 500 taken along the line A-A, as per FIG. 5. The wooden panel 500 includes two wood sheets W that sandwich therebetween a backing sheet B. This configuration of the wooden panel is herein referred to as a 2-ply wooden panel.

In an example embodiment, the wood sheet W is a sheet of wood. In an alternative example embodiment, the wood sheet W is engineered wood. The wood sheet W is produced so that the grain of the wood generally extends along the height of the wood sheet (i.e. the major axis in this example).

It will be appreciated that different types of wood or different types of engineered wood can be used. In an example embodiment, the wood or the engineered wood comes from a fast-growing tree species; an example of such a tree species is Basswood.

In an example aspect, the thickness of the wood sheet is thin enough so as to be translucent. More particularly, the thickness of each wood sheet is very thin so that light can pass through two layers of the wood sheet W and a backing sheet B. In an example aspect, the 2-ply wooden panel is a few millimeters thick.

The backing sheet B is a flexible material that also helps prevent the wood sheet from cracking or splitting along the length of the height. In particular, a wood sheet W is flexed back and forth so that the edges along the major axis (i.e. along the height) of the wood sheet come closer together and then father apart, and this allows for the bowing shown in FIG. 4 from the top down view. This movement can create cracks or splits along the height of the wood sheet, along the wood grain. In order to mitigate this issue, the backing sheet B is adhered between the two wood sheets W. This backing sheet B is thin and flexible.

In an example embodiment, the backing sheet B is formed at least in part from fibers that run in different directions compared to the vertically oriented wood grain.

In an example embodiment, the backing sheet B is translucent. In this way, light can pass through the wooden panel 500.

In an example embodiment, the backing sheet B comprises a fleece material. For example, the fleece material is made from synthetic nylon. In an alternative example embodiment, the backing sheet B comprises cellulose fibers, or a composite that includes cellulose fibers.

In another example embodiment, the backing sheet B comprises a plant-based nonwoven material.

An example of a plant-based material for the backing sheet B is Lyocell. In another example embodiment, the backing sheet B comprises Viscose, which is also derived from a plant-based material. In another example embodiment, the backing sheet B comprises Rayon, which is also derived from a plant-based material.

In another example embodiment, the backing sheet B comprises a plastic material. In another example embodiment, a plastic material is applied as a liquid to the back of the wood sheet and then cured or hardened. In another example embodiment, a plastic material is a plastic sheet that is adhered to the wood sheet.

In another example embodiment, the backing sheet B comprises a fabric material.

In another example embodiment, the backing sheet B comprises a sponge material.

In another example embodiment, the backing sheet B comprises a foam material.

In another example embodiment, the backing sheet B comprises a metal material.

In another example embodiment, the backing sheet B comprises wires.

In another example embodiment, the backing sheet B comprises a mesh material. The mesh can be made from one or more of metal, plastic and natural fibers.

In the example embodiment in which 2-ply wooden panels are used to form the core, the wooden partition looks to be uniformly made of wood from all viewing angles. In particular, even when looking down the interior of a void 400, the wood grain is still shown and has the same appearance as the wood grain when looking at the side of the partition. For example, a person looking at the partition form different viewing angles will only see wood material.

It will be appreciated that the 2-ply wooden panels are more dimensionally stable and symmetrical. A 2-ply wooden panel does not curl. By contrast, a 1-ply wooden panel (see FIG. 9) on its own can have a higher tendency to curl with changes in humidity as the wood sheet W and the backing sheet B would absorb moisture at different rates, and the sheets W and B expand and contract at different rates. In an embodiment that uses a 2-ply wooden panel, even though the backing sheet B absorbs moisture at a different rate than the wood sheets W, or expands and contracts at a different rate than the wood sheets W, the wood sheets W are on both sides of the backing sheet B, providing symmetry and stability.

The 2-ply wooden panels are also more flexible perpendicular to the grain than a single wood sheet W of the same thickness. The 2-ply wooden panels are also more resistant to tears that could form parallel to the grain, compared to a single wood sheet W of the same thickness. The 2-ply wooden panels are also stronger and have more rigidity along the height of the panel (e.g. parallel to the wood grain). This allows for a taller free-standing partition to be formed with a smaller width, as each wooden panel has a smaller width w or a taller height h, or both.

In the example embodiment in which the core is formed using translucent wooden panels, then the entire wooden partition is therefore translucent. This provides a very pleasing and desirable effect, in which light can pass through the wooden partition in a diffused manner. In particular, the wooden partition acts a light diffuser and a light filter that allows warm-colored light to pass through (e.g. warm colors such as yellow, orange, light brown, beige, etc.). The warm-colored light is evenly distributed. Furthermore, the wood grains of the wooden panels are visible, which is aesthetically pleasing to provide a natural feel.

In an example embodiment, a light source (e.g. light bulb(s), light emitting diode(s), etc.) is placed within the core of the flexible furniture article, and the light passes through the translucent wooden panels.

In an alternative example embodiment, the wooden panels are opaque.

It is herein recognized that existing flexible furniture articles (e.g. walls, partitions, chairs, tables, etc.) are made from paper, cardboard, or textiles. The wood panels described herein have a longer lifespan compared to these materials and have more wear and tear resistance at the bottom edges, as the bottom of the core rubs against a floor (e.g. when moving the core on the floor, when expanding the core, when collapsing the core, etc.).

In an alternative embodiment, instead of the core being formed with 2-ply wooden panels, the core is formed with 1-ply wooden panels. This is discussed in more detail below with respect to FIG. 10.

Figure 7A:
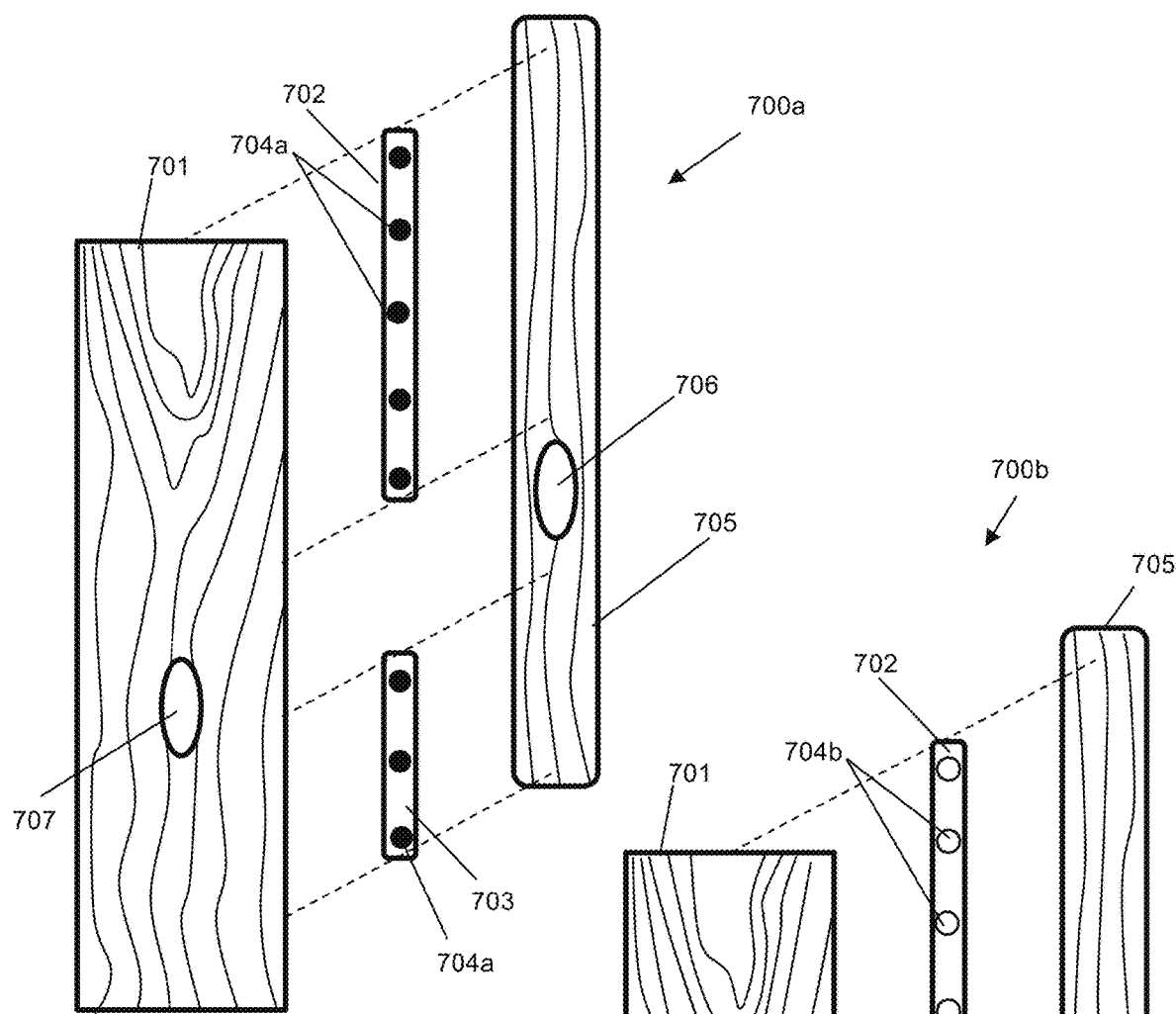
FIG. 7A is an exploded view of an example embodiment of an end panel having a first set of magnetic fasteners.
Figure 7B:
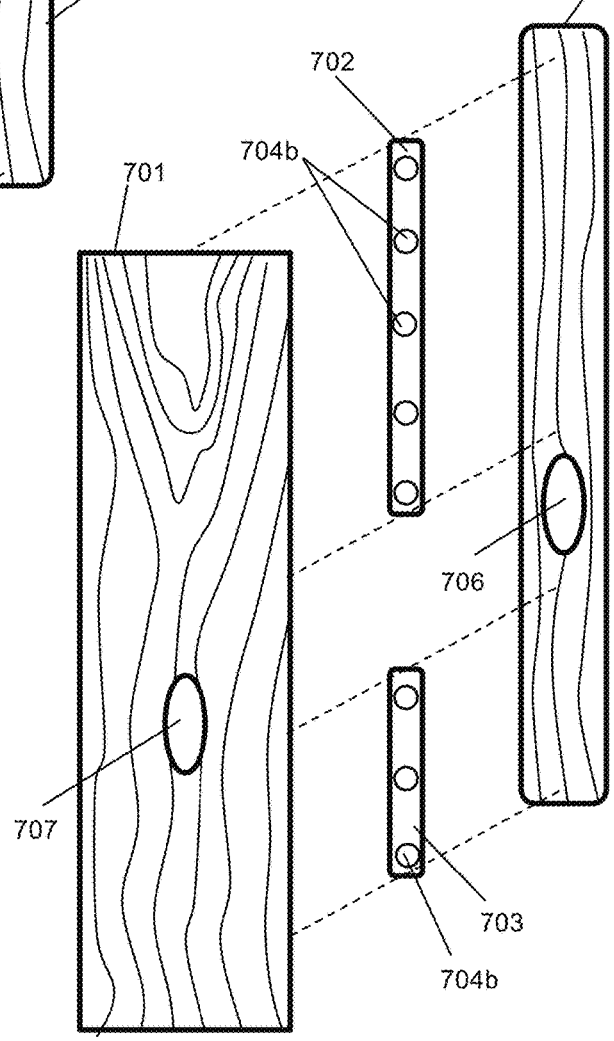
FIG. 7B is an exploded view of an opposite end panel having a second set of magnetic fasteners that are magnetically attracted to the first set of magnetic fasteners.

Turning to FIGS. 7A and 7B, an exploded view of end panels 700a, 700b, according to an example embodiment, are shown in isolation. For example, these end panels 700a and 700b are used to form the end panels 202 at opposite ends of the core 201, as per FIG. 2.

In FIG. 7A, the end panel 700a includes a wooden panel 701, magnetic fasteners 704a, holding strips 702, 703, and a covering wooden panel 705. The magnetic fasteners 704a are attached to the inward facing side of the wooden panel 701 using the holding strips 702, 703. In an example embodiment, the holding strips have holes defined therein and the magnetic fasteners sit within the holes of the holding strips. In an example aspect, the holes in the holding strips have the same shape as the outer perimeter of the magnetic fasteners. In an example aspect, the holding strips are plastic material, such as but not limited to a polypropylene material.

Figure 8:
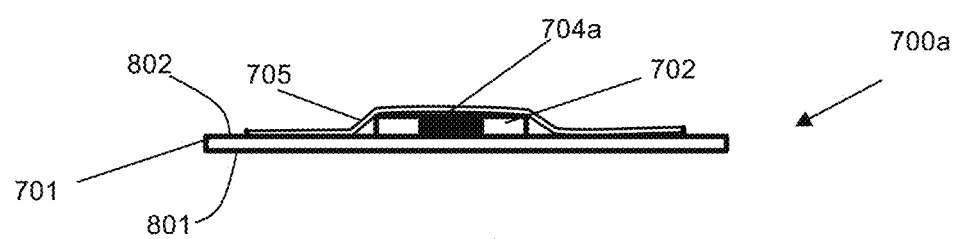
FIG. 8 is a cross-sectional view of the end panel shown in FIG. 7A showing the arrangement of various components.

The covering wooden panel 705, which is narrower and shorter than the wooden panel 701, is positioned over the holding strips 702, 703 and is adhered to the inward facing side of the wooden panel 701. This is better shown in FIG. 8, which shows a cross-sectional view showing the sandwiched configuration of the end panel 700a. The covering wooden panel 705 helps to hold the magnetic fasteners 704a and the holding strips 702,703 in place. As shown in FIG. 8, the outward facing surface 801 of the wooden panel 701 has a smooth uninterrupted surface and does not have protrusions. This is aesthetically pleasing. Furthermore, the smooth uninterrupted outward facing surface 801 also facilitates connecting multiple partitions together in seriatim to form a longer continuous partition. This is discussed in more detail with respect to FIGS. 11A and 11B. Continuing with FIG. 8, the magnetic fasteners, the holding strips 702, 703, and the covering wooden panel 705 are all positioned on the inward facing surface 802 of the wooden panel 701 so as to be out of sight. The covering wooden panel 705 also helps to provide a continuous wooden finish, so that even when looking down the void formed in-part by the end panel 700a, the inward facing side of the end panel 700a has a wooden finish.

In an example aspect, the wooden panel 701 is a 2-ply wooden panel and the covering wooden panel 705 is a 1-ply wooden panel. The grains of the 1-ply wooden panel are also vertically oriented. It can be appreciated that other thicknesses and different ply numbers can be used to form the wooden panel 701 and the covering wooden panel 705.

Figure 9:
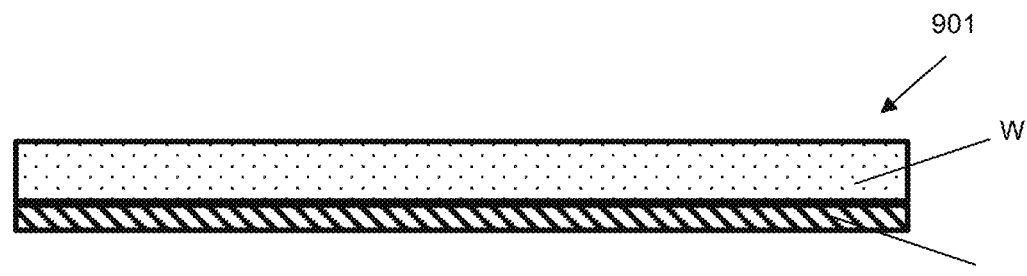
FIG. 9 is a cross-sectional view of a 1-ply construction.

An example of a 1-ply wooden panel 901 is shown in FIG. 9. It includes a wooden sheet W and a backing sheet B that are adhered to each other.

In the example embodiment in which the covering wooden panel 705 is a 1-ply wooden panel (e.g. the 1-ply wooden panel 901), the backing sheet B of the 1-ply wooden panel is adhered to the back facing surface 802 of the wooden panel 701. The wooden sheet W of the 1-ply wooden panel faces outwards in the same direction as the back facing surface 802.

Turning back to FIG. 7A, the wooden panel 701 has defined therein a hole 707 and the covering wooden panel 705 has defined therein a hole 706. When assembled, the holes 706 and 707 are aligned with each other. This forms a hole throughout the end panel 700a, which can be used as a handle. The holding strips 702 and 703 are positioned apart from each other, so that one holding strip 702 is positioned above the hole and the other holding strip 703 is positioned below the hole.

The end panel 700b that is positioned at the opposite end of the core is very similar to the end panel 700a. However, the magnetic fasteners 704b in the end panel 700b are configured to be magnetically attracted to the magnetic fasteners 404a in the end panel 700a. In particular, the magnetic fasteners 704b and 704a are positioned to be aligned with each other when the two end panels 700a, 700b are positioned in abutment with each other.

In an example aspect, the magnetic fasteners 704b and the magnetic fasteners 704a are magnets and are oriented to have opposite facing magnetic polarities so that they will be magnetically attracted to each other. In an alternative example aspect, the magnetic fasteners 704a are magnets and the magnetic fasteners 704b are a metal material that are attracted to the magnets.

The magnetic fasteners shown in FIGS. 7A and 7B are shown in a line. However, in an alternative example embodiment, the magnetic fasteners are arranged in multiple rows. In another alternative example embodiment, the magnetic fasteners are arranged in a grid pattern. It will be appreciated that the magnetic fasteners can be arranged in different ways.

It will be appreciated that the ends panels 700a and 700b also bow and flex along its width, similar to the other wooden panels of the core. This provides a uniform appearance.

Furthermore, as will be discussed below, when the end panel 700a connects with another end panel 700b (whether of the same partition or from two separate partitions), the holes 707 at each end panel are aligned and are hidden by the bowed surfaces that are in abutment with each other.

The configuration of the wooden end panels 700a, 700b can be similarly used for end panels in other flexible furniture articles (e.g. seats, benches, stands, tables, beds, lights etc.), although the shape will be used to match the furniture article.

Figure 10:
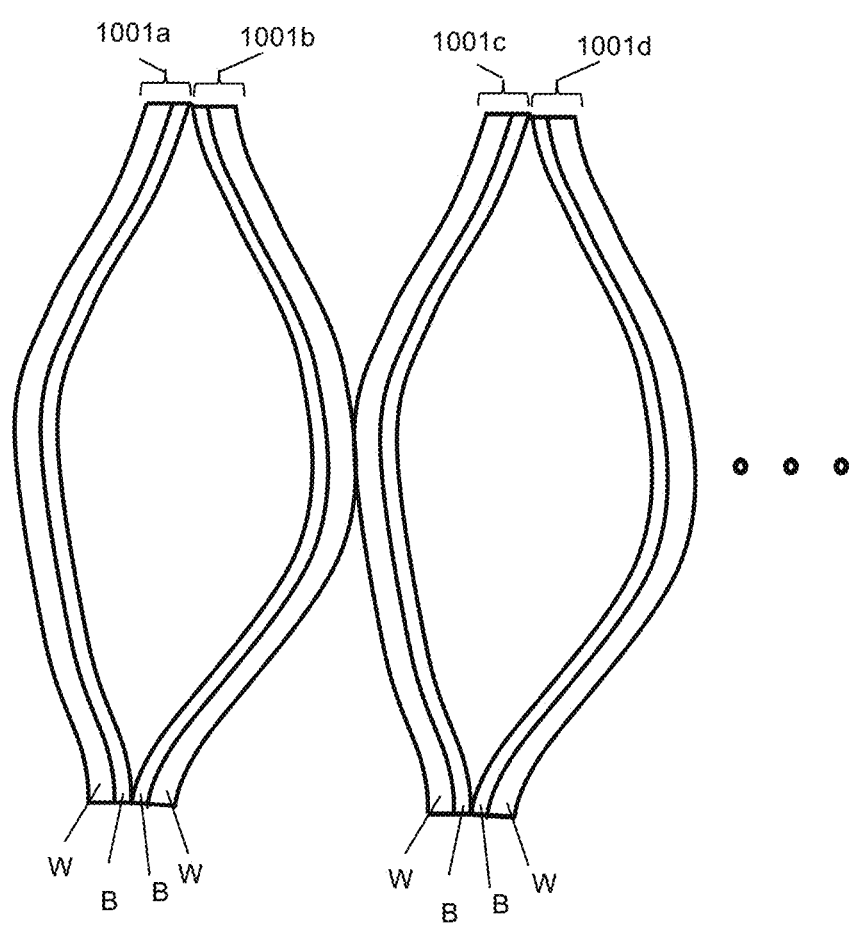
FIG. 10 is a top-down view of a partition formed using a 1-ply wood panels.

Turning to FIG. 10, another example embodiment of a core is shown that is formed with 1-ply wooden panels 1001a, 1001b, 1001c, 1001d. Each of the 1-ply wooden panels have a wood sheet W that is adhered to a backing sheet B. The wooden panel 1001a is adhered to the wooden panel 1001b, so that the backing sheets B of each wooden panel are in abutment with each other at the outer edges and the wood sheets W face away from each other. The wood sheet W of the wooden panel 1001b is adhered to the wood sheet W of the wooden panel 1001c. The backing sheet B of the wooden panel 1001c is adhered at the edges to the backing sheet B of the wooden panel 1001d. In this way, the wood sheets W face outwards and the backing sheets B are less visible.

In an example aspect of a partition formed with 1-ply wooden panels, it is herein recognized that each 1-ply wooden panel tends to curl because of the different moisture absorption rates and expansion rates between the wood sheet W and the backing sheet B. This curling tendency is countered by orienting the backing sheet B of one panel (e.g. panel 1001a) to face the backing sheet B of another panel (e.g. 1001b). In this way, the curling effect of the two panels (e.g. 1001a and 1001b) occurs in opposite directions and counteract each other.

In another example aspect, the 1-ply wooden panels are treated with a sealant so that they are impervious to moisture, or less likely to absorb moisture. This would also counteract the curling tendency in the 1-ply wooden panels.

Figure 11A:
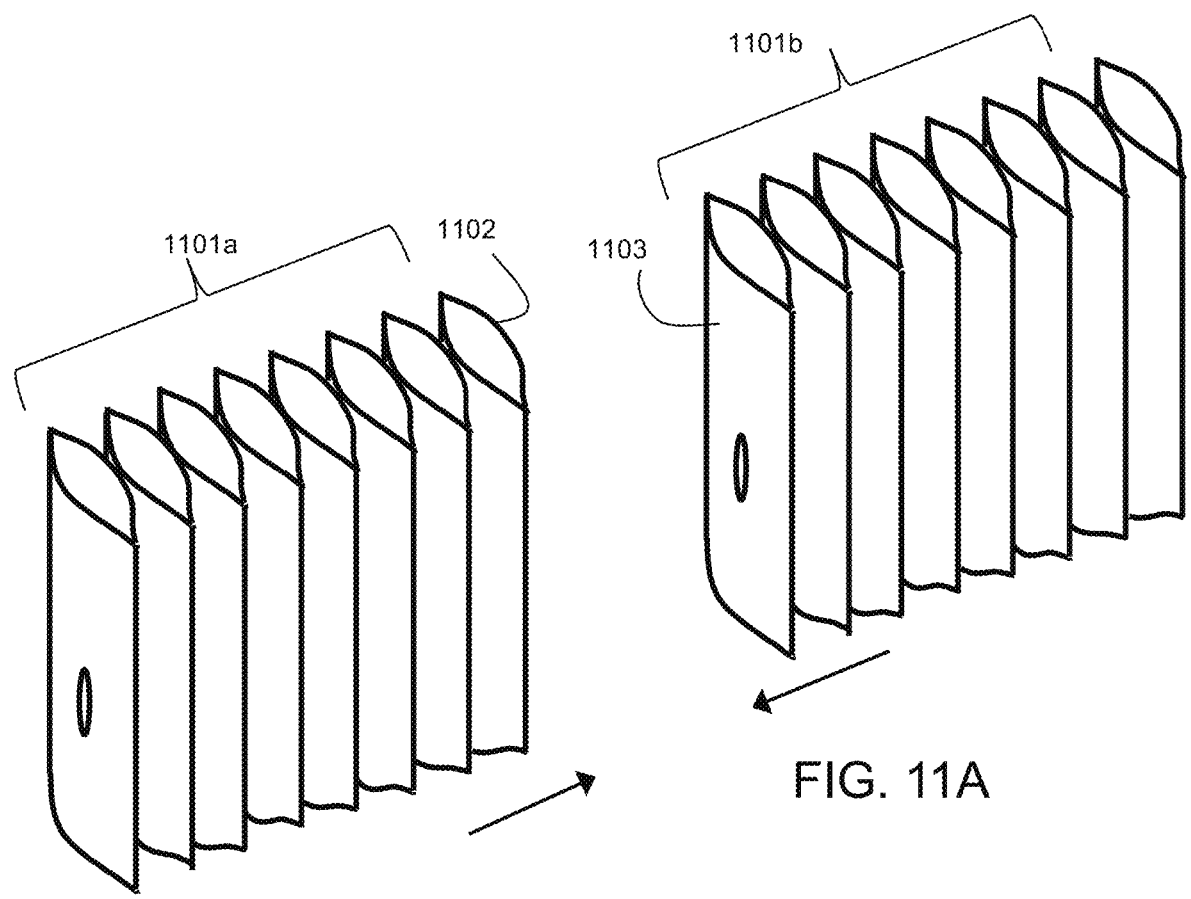
FIG. 11A is a top perspective view of two wooden partitions that are spaced apart and are moved towards each other.

Turning to FIG. 11A, a first wooden partition 1101a and a second wooden partition 1101b are initially spaced apart from each other. The end panel 1102 of the first wooden partition has magnetic fasteners on its backside (not shown in this particular figure) and the end panel 1103 on the second wooden partition has magnetic fasteners on its backside (also not shown in this figure). The magnetic fasteners of the first end panel 1102 and the magnetic fasteners on the second end panel 1103 are magnetically attracted to each other.

Figure 11B:
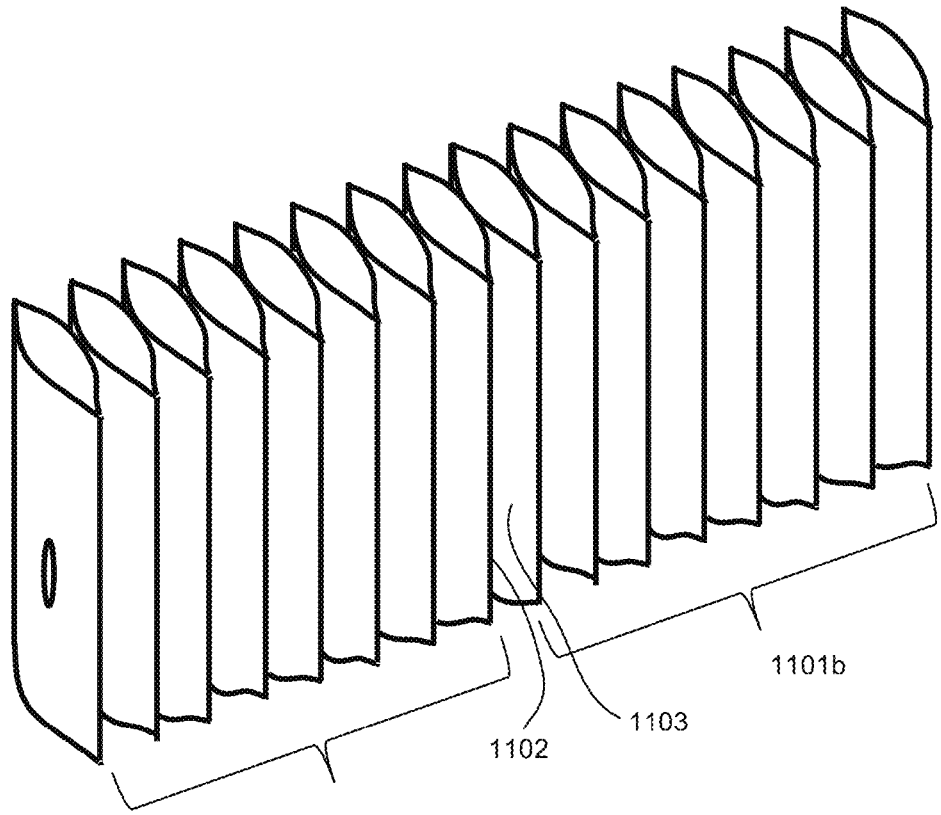
FIG. 11B is a top perspective view showing the two wooden partition connected together to form a longer and continuous wood partition.

The first end panel 1102 and the second end panel 1103 are positioned in abutment with each other and are held in place by the magnetic force of the magnetic fasteners. As per FIG. 11B, the connected first wooden partition 1101a and the second wooden partition 1101b form a long continuous wooden partition. As the end panels 1102 and 1103 look like the other panels in the wooden partition, the end of the first wooden partition 1101a cannot be easily distinguished from the beginning of the second wood partition 1101b when connected together. In particular, the end panels 1102 and 1103 also bow and flex outwards along the width of the panels, similar to the other panels in the core. Further, as can be seen in FIG. 11B, the holes in the end panels 1102, 1103 are not visible and are covered up by the abutting bowed surfaces of the end panels 1102, 1103. This provides a uniform look as if the resulting assembly was a single long partition. It will be appreciated that the wooden partitions 1101a and 1101b can be easily pulled apart from each other by overcoming the magnetic attractive force.

In an example embodiment, the arrangement shown in FIGS. 11A and 11B is made from 2-ply wood panels. In an alternative example embodiment, the arrangement shown in FIGS. 11A and 11B is made from 1-ply wood panels.

It will be appreciated that a wooden partition is shown in the figures. However, the same cellular construction comprising wooden panels can be used to form other types of flexible articles. Other examples of flexible articles include chairs, benches, light fixtures, tables, beds, columns, display stands, and enclosures. In other words, the wooden panels described herein can be used to form expandable and flexible articles with cores that have various configurations and shapes.

Figure 12:
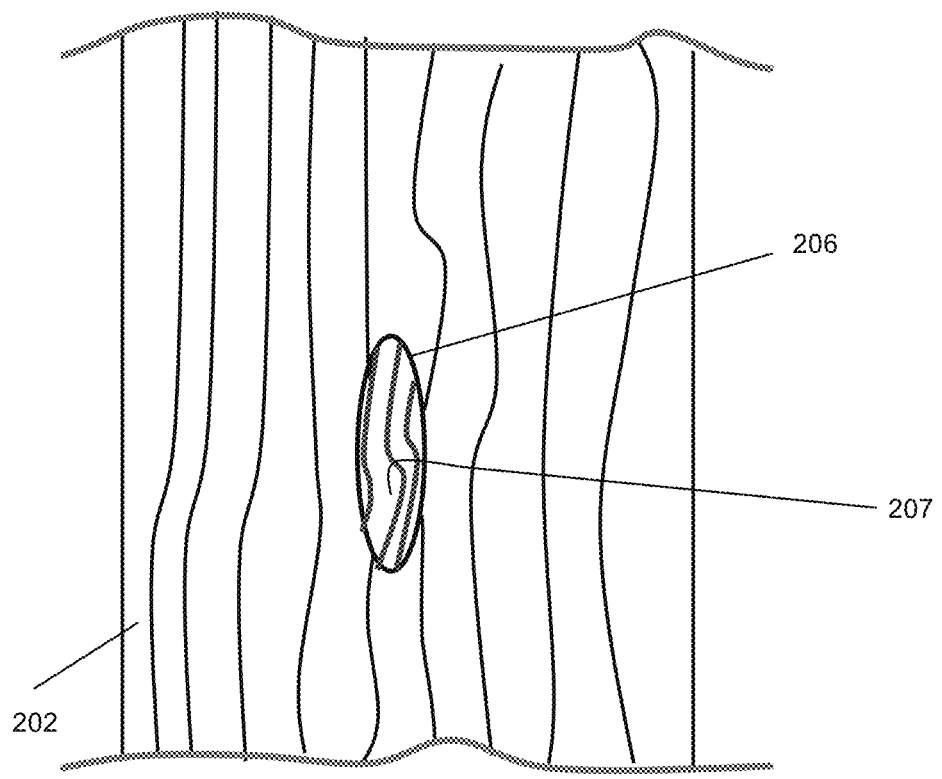
FIG. 12 is a partial view of a core looking directly at an end panel and through a hole defined in the end panel.

Turning to FIG. 12, a partial view of the partition 200 is shown when looking directly at the end panel 202. It is appreciated that the hole 206 defined in the panel allows a person to view the surface of another wooden panel 207 which has wood grain on both sides. For example, a 2-ply wooden panel has wood grain on both sides. As can be seen, even when a person looks through the hole 206, the person still sees wood grain. This makes the hole 206 visually discreet.

Figure 13:
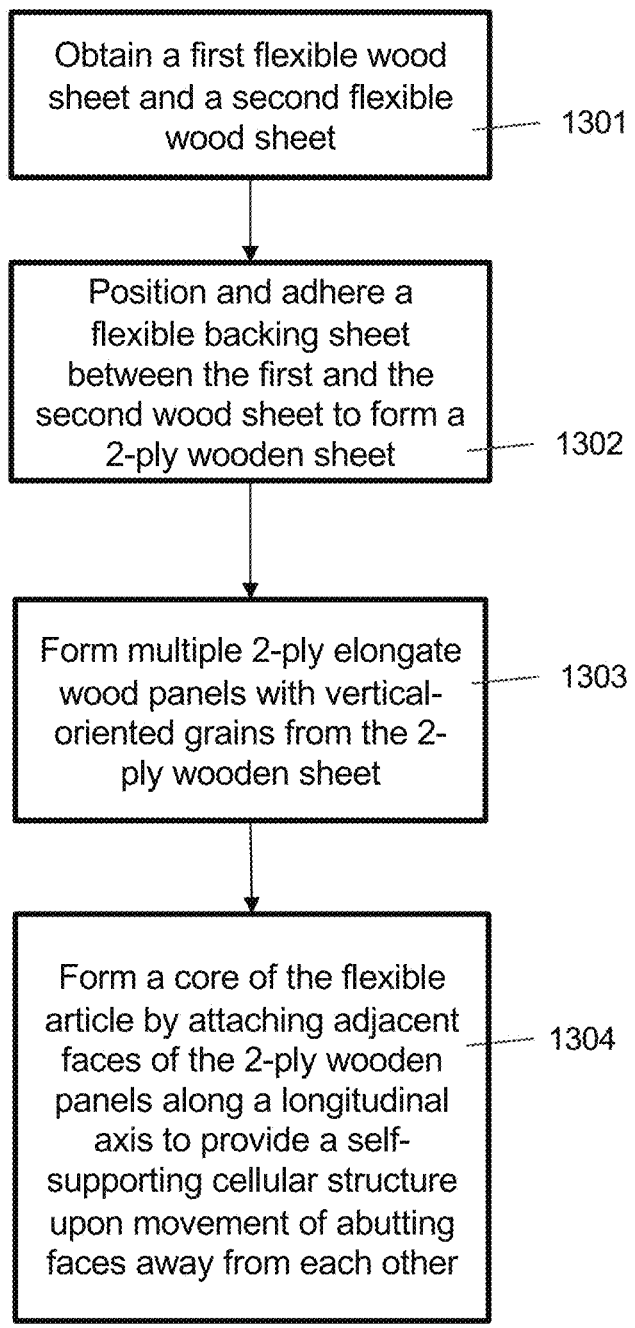
FIG. 13 is an example embodiment of a process for forming a wooden flexible article using 2-ply wood sheets.

Turning to FIG. 13, an example process is provided for forming a flexible article using 2-ply wooden panels. At block 1301, a first wood sheet and a second wood sheet are obtained. At block 1202, a flexible backing sheet is positions and adhered between the first and the second wood sheet to form a 2-ply wooden sheet. At block 1303, multiple 2-ply elongate wooden panels are formed with vertically oriented wood grains from the 2-ply wooden sheet. For example, the elongate wooden panels are cut from the wooden sheet so that the grains are vertically oriented along the height of the wooden panels.

At block 1304, a core of the flexible article is formed by attaching (e.g. by adhering or fastening, or both) adjacent faces of the 2-ply wooden panels along a longitudinal axis to provide a self-supporting cellular structure upon movement abutting faces away from each other.

Figure 14:
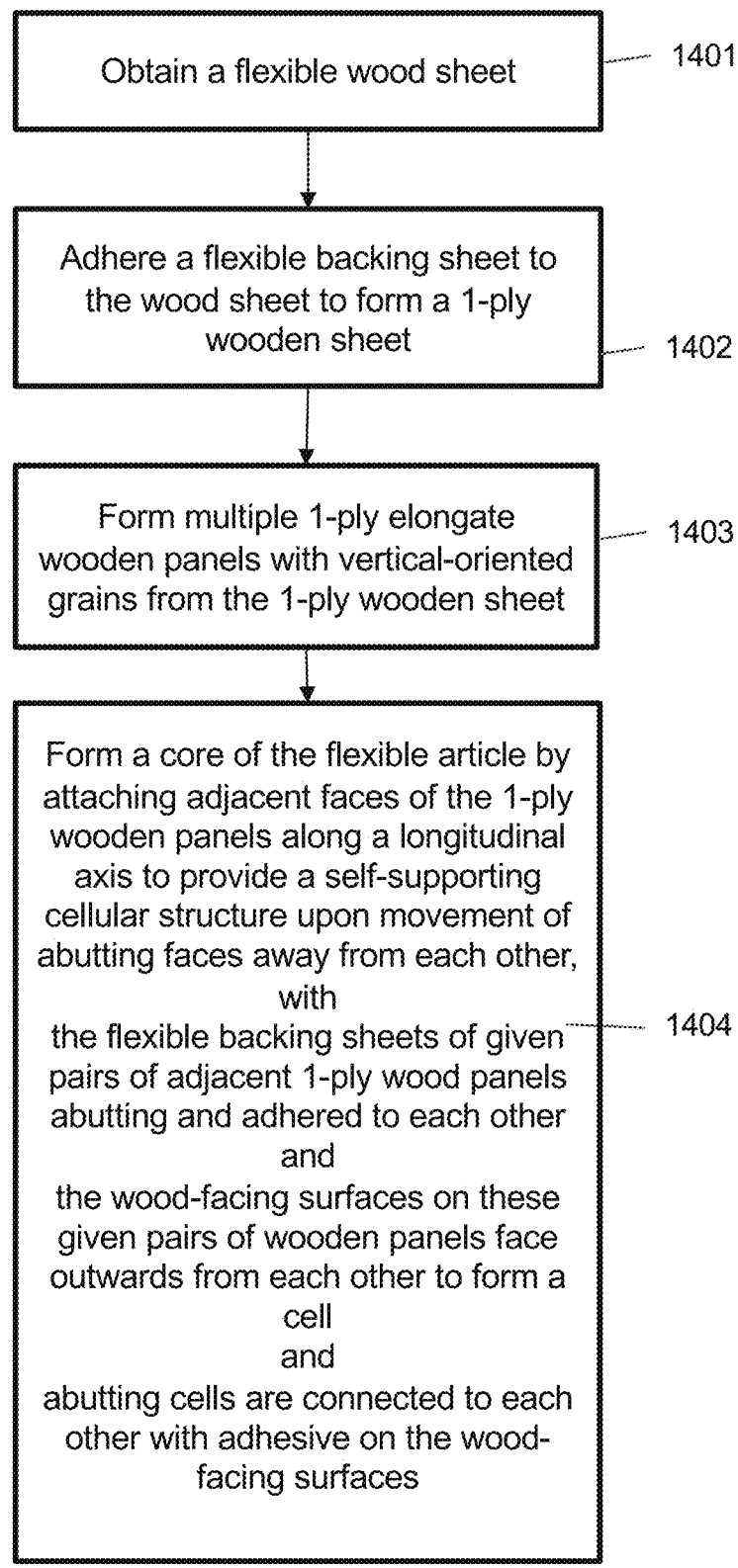
FIG. 14 is an example embodiment of a process for forming a wooden flexible article using 1-ply wood sheets.

Turning to FIG. 14, an example process is provided for forming a flexible article using 1-ply wooden panels. At block 1401, a wood sheet is obtained. At block 1402, a flexible backing sheet is adhered to the wood sheet to form a 1-ply wooden sheet. At block 1403, multiple 1-ply elongate wooden panels having vertically oriented wood grains are formed from the 1-ply wooden sheet. In an example embodiment, the 1-ply elongate wooden panels are cut from the 1-ply wooden sheet.

At block 1404, a core of the flexible article formed by attaching (e.g. by adhering or fastening, or both) adjacent faces of the 1-ply wooden panels along a longitudinal axis to provide a self-supporting cellular structure upon movement of abutting faces away from each other. In particular, the flexible backing sheets of a pair of adjacent 1-ply wooden panels abut each other and are adhered to each other along vertical strips (e.g. at the edges). The wood-facing surfaces of these pair of wooden panels face outwards from each other to form a cell. Abutting cells are connected to each other (e.g. by adhesive or fasteners, or both) on the wood-facing surfaces.

Figure 15:
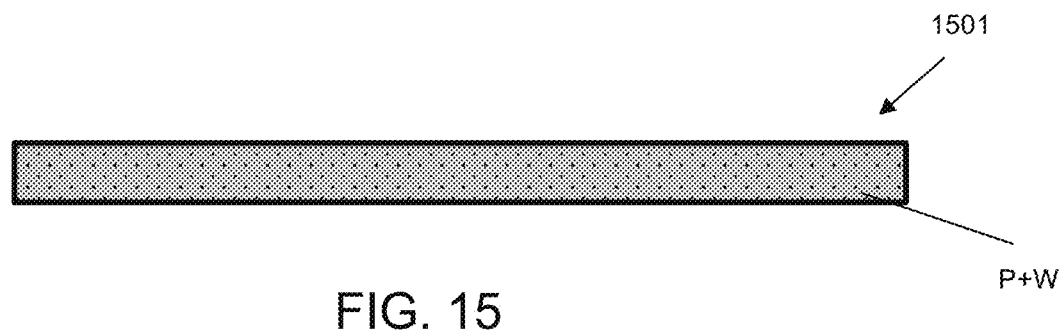
FIG. 15 is cross-sectional view of a wood panel impregnated with plasticizer.
Figure 16:
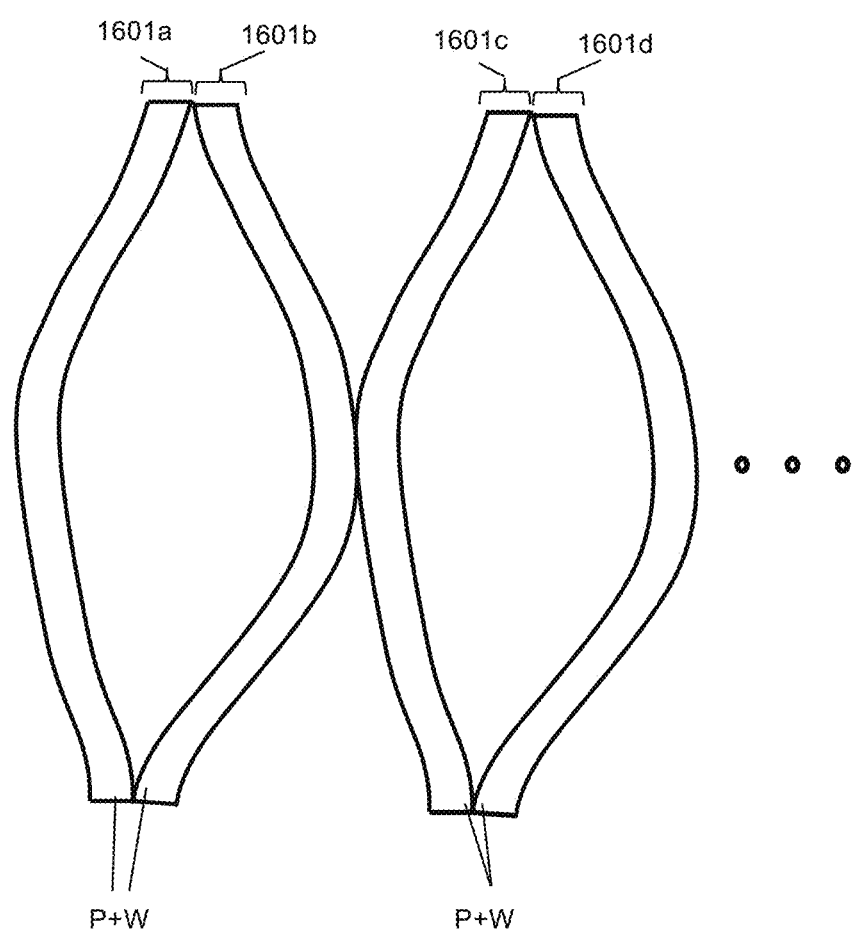
FIG. 16 is a top-down view of a partition formed using wood panels that are impregnated with plasticizer.

Turning to FIG. 15, another example embodiment of a wood panel 1501 is shown. It includes a wood sheet W that is impregnated with a plasticizer P (e.g. P+W). For example, the plasticizer soaked into the wood sheet. FIG. 16 shows another example embodiment of a flexible core is shown that is formed with 1-ply wooden panels 1601*a*, 1601*b*, 1601*c*, 1601*d*. These wooden panels 1601*a*, 1601*b*, 1601*c*, 1601*d* are impregnated or infused with a plasticizer P.

Figure 17:
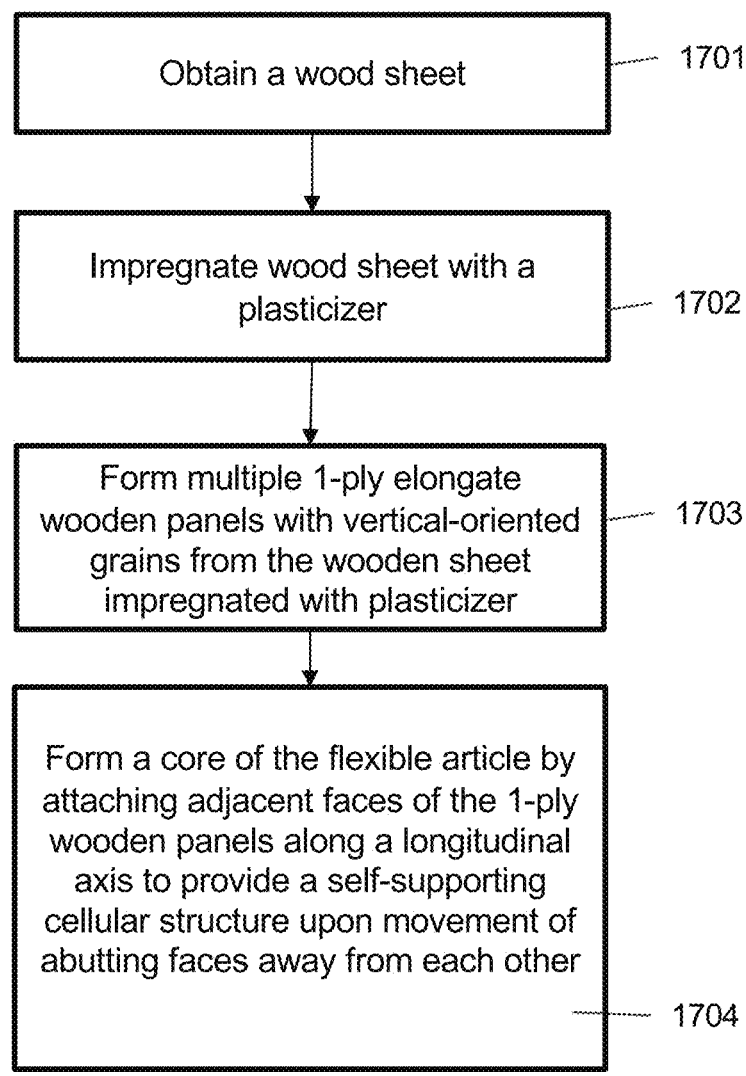
FIG. 17 is an example embodiment of a process for forming a wooden flexible article using wood panels impregnated with plasticizer.

Turning to FIG. 17, an example process is provided for forming a flexible article using 1-ply wooden panels that have been impregnated or infused with a plasticizer. At block 1701, a flexible wood sheet is obtained. At block 1702, the wood sheet is impregnated with a plasticizer. At block 1703, multiple 1-ply elongate wooden panels having vertically oriented wood grains are formed from the wooden sheet impregnated or infused with plasticizer. In an example embodiment, the 1-ply elongate wooden panels are cut from the wooden sheet that is impregnated or infused with polymer.

At block 1704, a core of the flexible article formed attaching (e.g. by adhering or fastening, or both) adjacent faces of the 1-ply wooden panels along a longitudinal axis to provide a self-supporting cellular structure upon movement of abutting faces away from each other.

In another example embodiment, a wood sheet W is impregnated with a plasticizer P, and a flexible backing sheet B is added onto a surface of the wood sheet. In other words, the construction of the panel is very similar to the embodiments shown in FIG. 9 and FIG. 10, except that the wood material W is additionally impregnated with plasticizer P.

Figure 18:
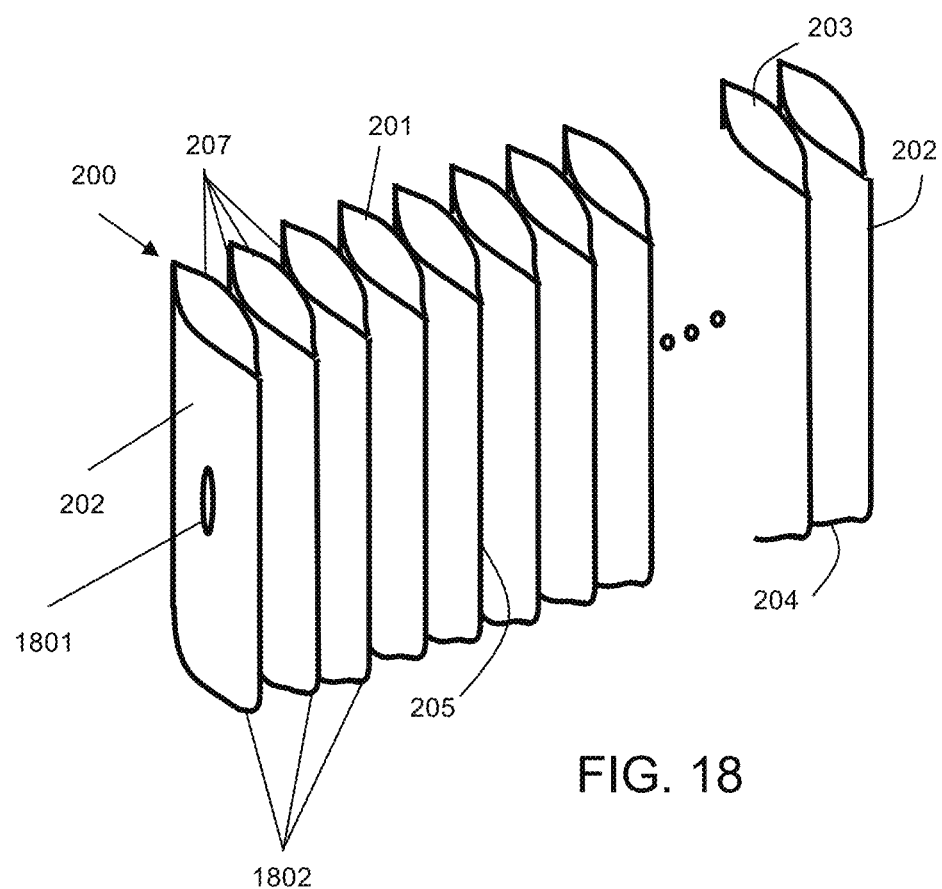
FIG. 18 is another example embodiment of a wood panel partition that includes a handle at each end panel.

FIG. 18 shows another example of a partition made from flexible wood panels. In an example aspect, the handle 2001 in the end panel 202 is positioned at the middle height of the panel to help distribute forces more evenly. In another example embodiment, at least the bottom corners 2002 of the wood panels have a radius. In other words, the corners 2002 are rounded. This helps reduce damage to the wood panels.

The flexible core made from flexible wood panels can be used to make various furniture articles. Examples of different articles made from the flexible wood panels are shown in FIGS. 21 to 30.

Figure 21:
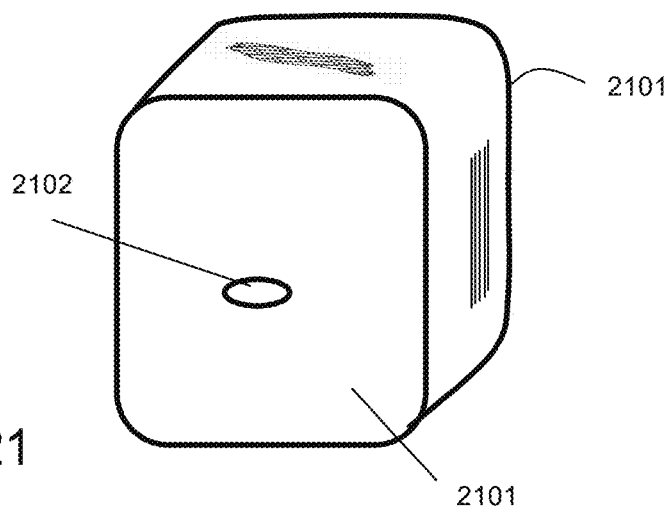
FIG. 21 is a perspective view of a flexible seat in a retracted state and including a cellular core formed by wood panels.
Figure 22:
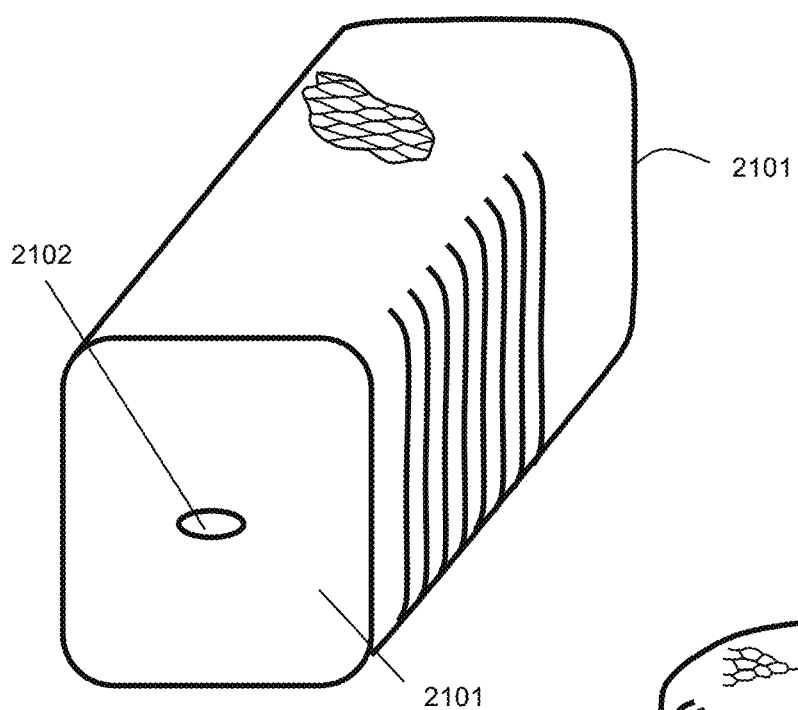
FIG. 22 is a perspective view of the flexible seat shown in FIG. 21, but in an elongated state.
Figure 23:
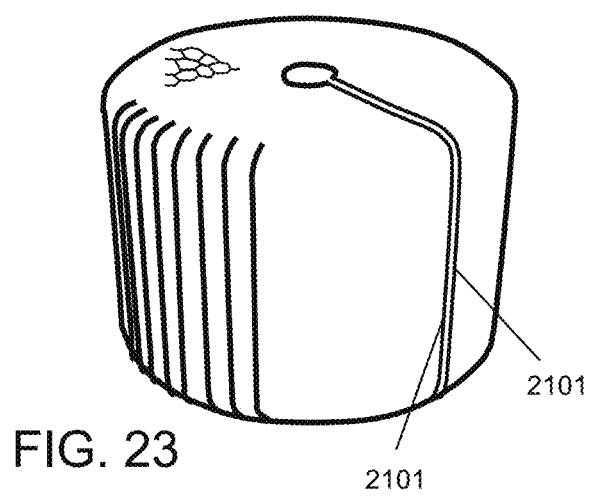
FIG. 23 is a perspective view of the flexible seat shown in FIG. 21, but in an expanded round state.

FIG. 21 shows a flexible seat in a compressed or retracted state. In particular, the flexible core between the two end panels 2101 is compressed. The same seat can be extended and flexed into a straight bench as per FIG. 22, or into a rounded seat as per FIG. 23. In the rounded configuration in FIG. 23, the two end panels 2101 on opposite ends to the flexible core are positioned to face each other. The cells of the flexible core of the seat extend vertically. It will be appreciated that the seat can be flexed into a serpentine shape or some other irregular shape. In an example aspect, a handle 2102 (e.g. a hole) is included in the end panel 2101.

Figure 24:
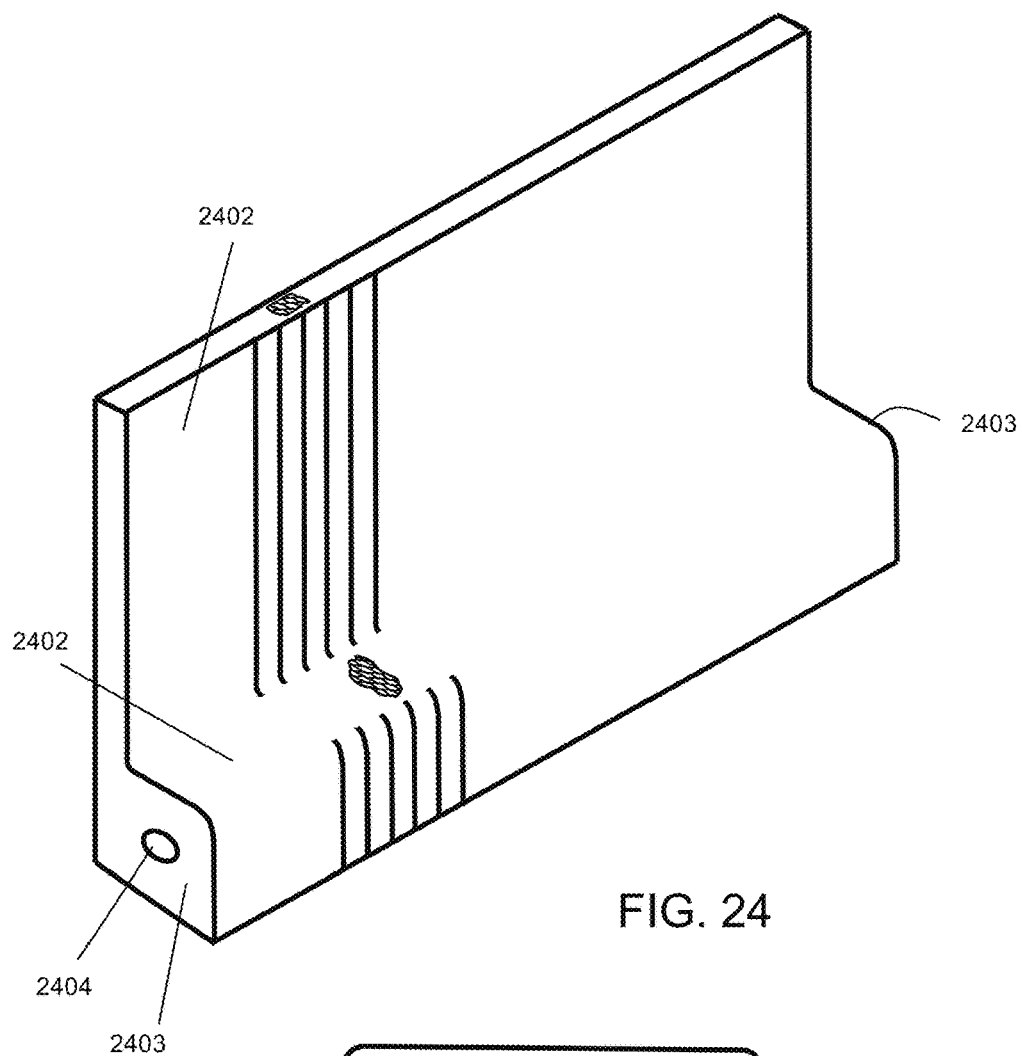
FIG. 24 is a perspective view of another example embodiment of a flexible seat that includes a cellular core formed by wood panels.

FIG. 24 shows another example of a flexible seat that has been extended. The seat includes a seating surface 2401 and a seat back 2402. In an example embodiment, the seat back 2402 is high to also acts as a partition and provide some privacy. The cells of the flexible core of the seat extend vertically. In an example aspect, a handle (e.g. a hole) 2404 is included in the end panel 2403.

Figure 25:
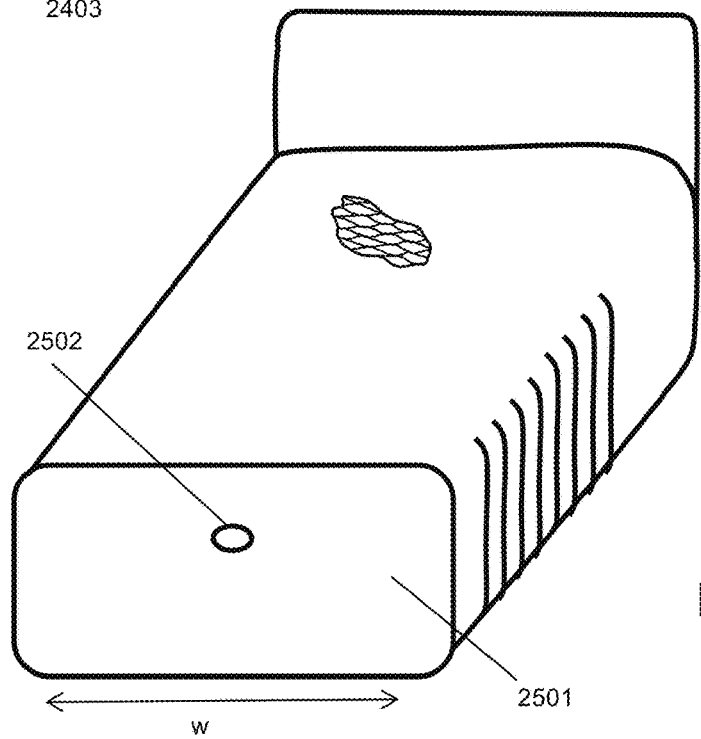
FIG. 25 is a perspective view of an example embodiment of a flexible bed that includes a cellular core formed by wood panels.

FIG. 25 shows an example of a flexible bed that has been extended. It has a wider base to accommodate at least one person to lie down on. In an example embodiment, the width (w) of the flexible bed is wider to accommodate two or more people to lie down on. The cells of the flexible core of the seat extend vertically. In an example aspect, a handle 2502 (e.g. a hole) is included in the end panel 2501.

Figure 26:
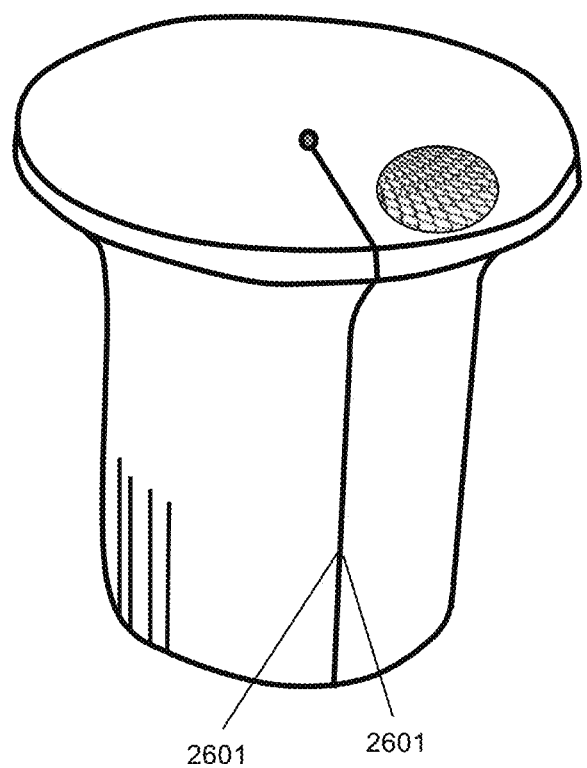
FIG. 26 is a perspective view of an example embodiment of a flexible table that includes a cellular core formed by wood panels.

FIG. 26 shown an example of table made from a flexible core that has been extended into a round configuration. The openings of the cells of the core, for example, can be seen on the top surface of the table. In this rounded configuration of the table, the opposite end panels 2601 of the flexible core are positioned to face each other.

Figure 27:
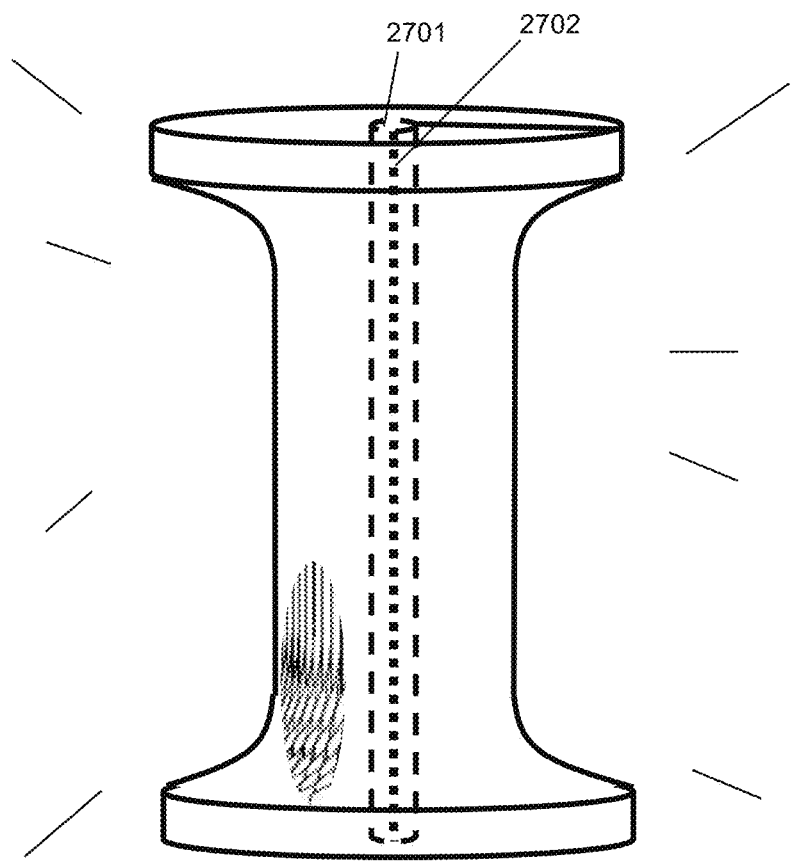
FIG. 27 is a perspective view of an example embodiment of a flexible column that includes a cellular core formed by wood panels.

FIG. 27 shows a column formed from a flexible core of flexible wooden panels. The cells of the flexible core extend vertically. In an example aspect, the column defines therein in a channel 2701 and a light source 2702 is positioned in the channel. In this example, the channel 2701 is vertically oriented.

It will be appreciated that the channel can also be cut across the cells and extends from one end panel to another end panel. In this way, the channel will take the shape the flexed core. For example, if the core is flexed to be a circle, then the channel is also flexed into a circle. For example, if the core is flexed to a serpentine shape, then the channel also takes the serpentine shape. A light or some other device or object can be positioned into the channel.

Figure 28:
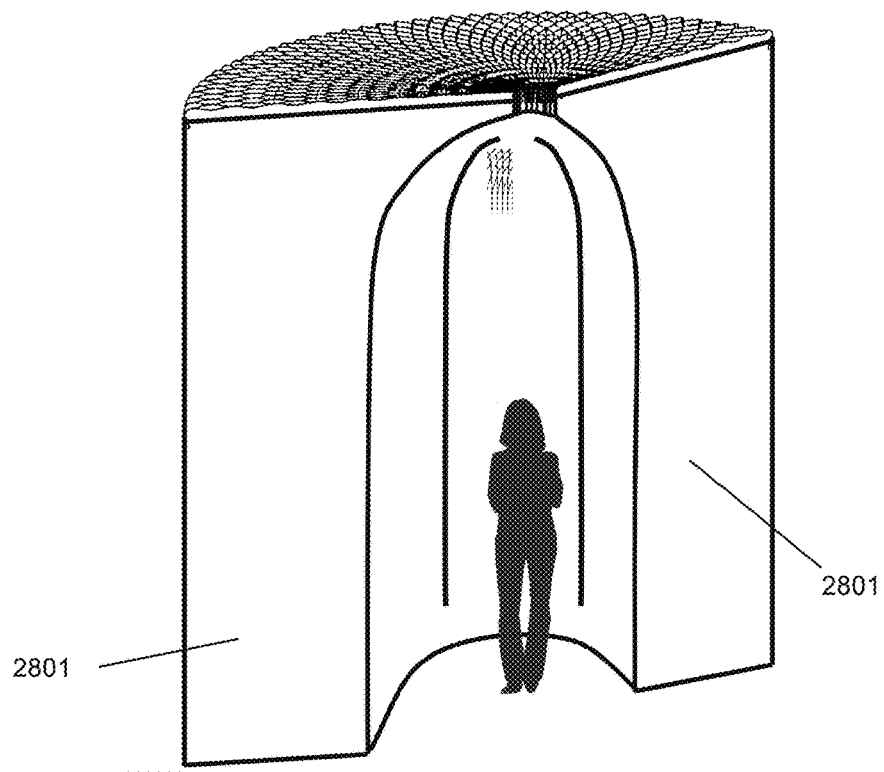
FIG. 28 is a perspective view of an example embodiment of a flexible enclosure in a partially opened state, and that includes a cellular core formed by wood panels.
Figure 29:
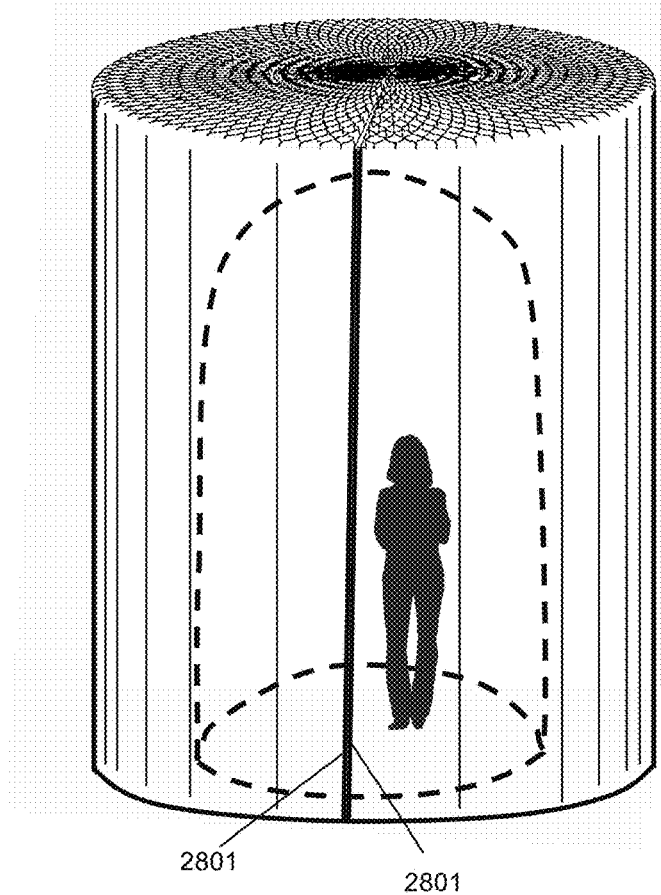
FIG. 29 is a perspective view of the example embodiment of the flexible enclosure shown in FIG. 28, and in a closed state.

FIG. 28 shows an enclosure that defines a space for a person. The enclosure in FIG. 28 is opened and shows two end panels 2801. The enclosure in FIG. 29 is then closed by positioning the two end panels 2801 to face each other. The cells in this example are vertically oriented.

Figure 30:
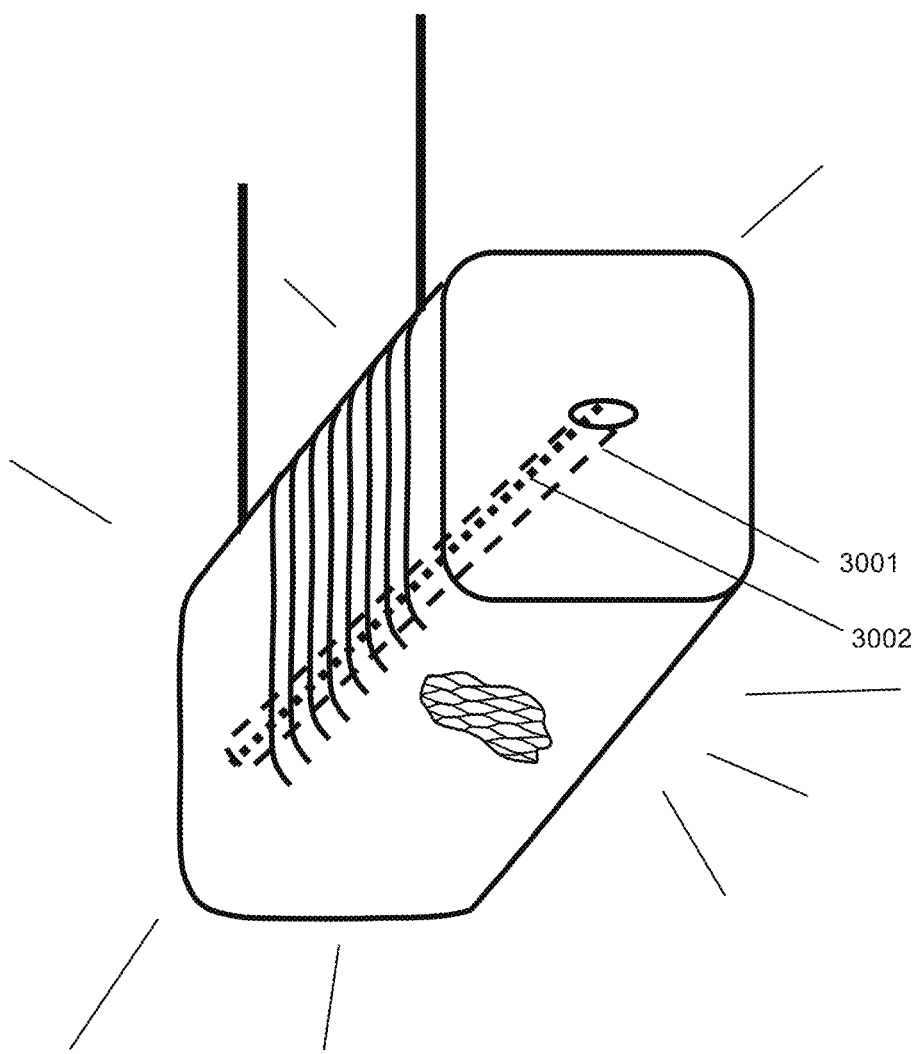
FIG. 30 is a perspective view of an example embodiment of a flexible light that includes a cellular core formed by wood panels.

FIG. 30 shows a flexible light. The core has a channel 3001 that extends along the length of the flexible core, for example, from one end panel to another end panel. A light source 3002 is positioned within the channel 3001. The light source 3002 includes, for example, one or more light emitting diodes.

Other example embodiments and example aspects are provided below.

In an example embodiment, an article of flexible furniture is provided that includes a core formed from a plurality of laminar wooden panels and each panel includes a pair of oppositely directed major faces, delimited by a pair of longitudinal edges and by a pair of lateral edges. Adjacent faces of the panels are interconnected along a longitudinal axis to provide a self-supporting cellular structure upon movement of abutting faces away from each other. Opposite ends of the core terminate in a pair of end panels whereby the end panels may be moved apart to expand the cellular structure and extend the length of the core. The core includes cells that include voids extending in a direction. Each of the laminar wooden panels and the end panels include a flexible wood sheet with the grain of the flexible wood sheet generally oriented in the same direction as the cells.

In an example aspect, the cells are vertically oriented and the grain of the wood sheet is also vertically oriented.

In another example aspect, the wood sheet is impregnated with plasticizer.

In another example aspect, each of the laminar wooden panels further includes a flexible backing sheet that is adhered to said wood sheet.

In another example aspect, each of said cells comprises a pair of the laminar wooden panels with the flexible backing sheets of the pair oriented to face each other and are adhered to each other.

In another example aspect, each of the laminar wooden panels further includes a flexible backing sheet and another wood sheet, and the flexible backing sheet is adhered between the two wood sheets.

In another example aspect, the flexible backing sheet includes fleece. In another example aspect, the flexible backing sheet includes nylon fibers. In another example aspect, the flexible backing sheet includes cellulose fibers. In another example aspect, the flexible backing sheet includes a nonwoven plant-based textile. In another example aspect, the flexible backing sheet includes Lyocell. In another example aspect, the flexible backing sheet includes Viscose. In another example aspect, the flexible backing sheet includes fibers that extend along one or more directions that are different from an orientation of the grain. In another example aspect, the flexible backing sheet is translucent. In another example aspect, the flexible backing sheet is a fabric. In another example aspect, the flexible backing sheet includes a mesh. In another example aspect, the flexible backing sheet includes a wire. In another example aspect, the flexible backing sheet includes a plastic. In another example embodiment, the flexible backing sheet includes a foam. In another example embodiment, the flexible backing sheet includes a sponge.

In another example aspect, each of said laminar wooden panels is translucent.

In an example embodiment, an article of flexible furniture is provided that includes a core formed from a plurality of laminar wooden panels and each panel having a pair of oppositely directed major faces, delimited by a pair of longitudinal edges and by a pair of lateral edges, adjacent faces of said panels being interconnected along a longitudinal axis to provide a self-supporting cellular structure upon movement of abutting faces away from each other. Opposite ends of the core terminate in a pair of end panels whereby the end panels may be moved apart to expand the cellular structure and extend the length of the core. Each of the panels and the end panels include two wood sheets and a flexible backing sheet sandwiched and adhered between the two wood sheets.

In an example aspect, the panels are translucent.

In another example aspect, the flexible backing sheet includes fleece. In another example aspect, the flexible backing sheet includes nylon fibers. In another example aspect, the flexible backing sheet includes cellulose fibers. In another example aspect, the flexible backing sheet includes a nonwoven plant-based textile. In another example aspect, the flexible backing sheet includes Lyocell. In another example aspect, the flexible backing sheet includes Viscose.

In another example aspect, the flexible backing sheet includes fibers that extend along one or more directions that are different from said longitudinally oriented grains.

In another example aspect, the adjacent faces of the panels are interconnected by a pH neutral adhesive.

In another example aspect, each one of the end panels includes an outward facing side and an inward facing side, and one or more magnetic fasteners are positioned on said inward facing side and are covered by a covering wooden panel.

In another example aspect, each one of the end panels further includes a holding strip that holds the one or more magnetic fasteners, and the holding strip is positioned between said inward facing side and said covering wooden panel.

In another example aspect, the covering wooden panel is a 1-ply wooden panel comprising one wooden sheet adhered to another backing sheet.

In another example aspect, the outward facing side of each one of said end panels is uninterrupted.

In another example aspect, each one of the end panels has a first hole defined therein and the covering wooden panel has a second hole defined therein, and the first hole and the second hole are aligned with each other.

In another example aspect, each one of the end panels is flexible to bow outwards along its width.

In another example aspect, the wood sheets include longitudinally oriented grains.

In another example aspect, the article is a free-standing partition.

In another example aspect, the wood sheets are engineered wood.

In another example embodiment, an article of flexible furniture is provided that includes a core formed from a plurality of laminar wooden panels and each panel having a pair of oppositely directed major faces, delimited by a pair of longitudinal edges and by a pair of lateral edges, adjacent faces of said panels being interconnected along a longitudinal axis to provide a self-supporting cellular structure upon movement of abutting faces away from each other. Opposite ends of the core terminate in a pair of end panels whereby the end panels may be moved apart to expand said cellular structure and extend the length of said core. Each of the panels and the end panels include a wood sheet and a flexible backing sheet adhered to the wood sheet.

In an example aspect, the core comprises cells, and each cell includes a pair of the panels with the flexible backing sheets of the pair being oriented to face each other and are adhered to each other.

It will be appreciated that the features described herein can be combined in different ways to form various embodiments, whether or not these combinations have been explicitly described herein.

Although the invention has been described with reference to certain specific embodiments, various modifications thereof will be apparent to those skilled in the art without departing from the spirit and scope of the invention as outlined in the claims appended hereto. The entire disclosures of all references recited above are incorporated herein by reference.

What is claimed is:

1. An article of flexible furniture comprising a core, said core comprising a plurality of wooden panels and each one of said plurality of wooden panels comprising a pair of oppositely directed major faces, said plurality of wooden panels being interconnected along a longitudinal axis to provide a cellular structure, opposite ends of said core terminating in a pair of end panels whereby said pair of end panels are operable to be moved apart to expand said cellular structure, wherein each one of said plurality of wooden panels and said pair of end panels comprise two wood sheets and a flexible backing sheet sandwiched and adhered between said two wood sheets.

2. The article of claim 1 wherein each of said plurality of wooden panels is translucent.

3. The article of claim 1 wherein said flexible backing sheet comprises fleece.

4. The article of claim 1 wherein said flexible backing sheet comprises nylon fibers.

5. The article of claim 1 wherein said flexible backing sheet comprises cellulose fibers.

6. The article of claim 1 wherein said flexible backing sheet comprises a nonwoven plant-based textile.

7. The article of claim 1 wherein said flexible backing sheet comprises Lyocell.

8. The article of claim 1 wherein said flexible backing sheet comprises Viscose.

9. The article of claim 1 wherein each of said wood sheets comprise a plurality of wood grains extending in a same orientation and said flexible backing sheet comprises fibers that extend along one or more directions that are different from said same orientation of said plurality of wood grains.

10. The article of claim 1 wherein said plurality of wooden panels being interconnected by a pH neutral adhesive.

11. The article of claim 1 wherein each one of said pair of end panels comprises an outward facing side and an inward facing side, and one or more magnetic fasteners are positioned on said inward facing side and are covered by a covering wooden panel.

12. The article of claim 11 wherein each one of said pair of end panels further comprises a holding strip that holds the one or more magnetic fasteners, and said holding strip is positioned between said inward facing side and said covering wooden panel.

13. The article of claim 11 wherein said covering wooden panel is a 1-ply wooden panel comprising one wooden sheet adhered to another backing sheet.

14. The article of claim 11 wherein said outward facing side of each one of said pair of end panels is uninterrupted.

15. The article of claim 11 wherein each one of said pair of end panels has a first hole defined therein and said covering wooden panel has a second hole defined therein, and said first hole and said second hole are aligned with each other.

16. The article of claim 1 wherein each one of said pair of end panels is flexible to bow outwards along a width respective to said pair of each one of said pair of end panels.

17. The article of claim 1 wherein said cellular structure comprises a plurality of cells oriented to extend in a vertical direction, and each of said wood sheets comprise a plurality of wood grains extending in said vertical direction.

18. The article of claim 1 wherein said wood sheets are engineered wood.

19. An article of flexible furniture comprising a core, said core comprising a plurality of wooden panels and each of said wooden panels comprising a pair of oppositely directed major faces, said plurality of wooden panels being interconnected along a longitudinal axis to provide a cellular structure upon movement of said plurality of wooden panels away from each other, opposite ends of said core terminating in a pair of end panels whereby said pair of end panels are operable to be moved apart to expand said cellular structure, wherein said core comprises a plurality of cells that respectively define a plurality of voids, and wherein each of said plurality of wooden panels and said pair of end panels comprise a flexible wood sheet and a flexible backing sheet adhered to said flexible wood sheet.

20. The article of claim 19 wherein said plurality of cells are vertically oriented and each said flexible wood sheet comprises a plurality of wood grains that are also vertically oriented.

21. The article of claim 20 wherein said flexible backing sheet comprises fibers that extend along one or more directions that are different from an orientation of said plurality of wood grains.

22. The article of claim 19 wherein each of said plurality of cells comprises a pair of said plurality of wooden panels with said flexible backing sheets of said pair of said plurality of wooden panels oriented to face each other and are adhered to each other.

23. The article of claim 19 wherein said flexible backing sheet comprises fleece.

24. The article of claim 19 wherein said flexible backing sheet comprises nylon fibers.

25. The article of claim 19 wherein said flexible backing sheet comprises cellulose fibers.

26. The article of claim 19 wherein said flexible backing sheet comprises a nonwoven plant-based textile.

27. The article of claim 19 wherein said flexible backing sheet is translucent.

28. The article of claim 19 wherein said flexible backing sheet comprises a fabric.

29. The article of claim 19 wherein said flexible backing sheet comprises a mesh.

30. The article of claim 19 wherein said flexible backing sheet comprises a plastic.

31. The article of claim 19 wherein said flexible backing sheet comprises a foam or a sponge.

32. The article of claim 19 wherein each of said plurality of wooden panels is translucent.

33. The article of claim 19 wherein each of said plurality of wooden panels further comprises a second flexible wood sheet and said flexible backing sheet is sandwiched and adhered between said flexible wood sheet and said second flexible wood sheet.

34. An article of flexible furniture comprising a core, said core comprising a plurality of wooden panels and each of said wooden panels comprising a pair of oppositely directed major faces, said plurality of wooden panels being interconnected along a longitudinal axis to provide a cellular structure upon movement of said plurality of wooden panels away from each other, opposite ends of said core terminating in a pair of end panels whereby said pair of end panels are operable to be moved apart to expand said cellular structure, wherein said core comprises a plurality of cells that respectively define a plurality of voids, and wherein each one of said plurality of wooden panels and said pair of end panels comprises a flexible wood sheet with a plurality of wood grains of said flexible wood sheet oriented in a same direction that said plurality of voids of said plurality of cells extend.

* * * * *